(12) United States Patent
Katukam et al.

(10) Patent No.: US 8,078,756 B2
(45) Date of Patent: Dec. 13, 2011

(54) COMPUTING A PATH FOR AN OPEN ENDED UNI-DIRECTIONAL PATH PROTECTED SWITCHED RING

(75) Inventors: Suresh Katukam, Rohnert Park, CA (US); Anix Anbiah, Anna Nagar Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1066 days.

(21) Appl. No.: 10/453,390

(22) Filed: Jun. 3, 2003

(65) Prior Publication Data
US 2005/0010681 A1 Jan. 13, 2005

(51) Int. Cl.
*G06F 15/173* (2006.01)
*G06F 15/16* (2006.01)
*G01R 31/08* (2006.01)
*H04L 12/26* (2006.01)
*H04L 1/00* (2006.01)
*G06F 15/177* (2006.01)
*G06F 11/00* (2006.01)

(52) U.S. Cl. ........ 709/239; 709/226; 709/251; 370/222; 370/228; 370/258

(58) Field of Classification Search .......... 709/217–219, 709/223, 224, 227, 238, 239, 249, 251; 715/733–736; 370/217, 221–224, 228, 258
See application file for complete search history.

(56) References Cited

U.S. PATENT DOCUMENTS

| | | | |
|---|---|---|---|
| 4,862,496 A * | 8/1989 | Kelly et al. .............. 379/221.01 |
| 5,253,248 A | 10/1993 | Dravida et al. ................. 370/16 |
| 5,459,716 A | 10/1995 | Fahim et al. |
| 5,467,345 A | 11/1995 | Cutler, Jr. et al. ................ 370/60 |
| 5,497,368 A | 3/1996 | Reijnierse et al. .............. 370/54 |
| 5,627,822 A | 5/1997 | Edmaier et al. ................ 370/218 |
| 5,727,051 A * | 3/1998 | Holender .................. 379/112.05 |
| 5,854,899 A | 12/1998 | Callon et al. ............. 395/200.68 |
| 5,923,646 A | 7/1999 | Mandhyan |
| 6,073,248 A | 6/2000 | Doshi et al. ........................ 714/4 |
| 6,078,590 A | 6/2000 | Farinacci et al. .............. 370/432 |
| 6,185,210 B1 | 2/2001 | Troxel ............................ 370/395 |
| 6,272,107 B1 | 8/2001 | Rochberger et al. |
| 6,301,254 B1 * | 10/2001 | Chan et al. ..................... 370/397 |
| 6,359,859 B1 * | 3/2002 | Brolin et al. ................... 370/218 |
| 6,430,150 B1 | 8/2002 | Azuma et al. |
| 6,433,903 B1 * | 8/2002 | Barry et al. ...................... 398/79 |
| 6,532,088 B1 * | 3/2003 | Dantu et al. ..................... 398/43 |

(Continued)

OTHER PUBLICATIONS

Zhang, Yuna and Yang, Oliver. "Different Implementations of Token Tree Algorithm for DWDM Network Protection/Restoration," 11th Intl. Conference on Computer Communications and Networks, Oct. 14-16, 2002, pp. 290-295.*

(Continued)

*Primary Examiner* — Andrew Caldwell
*Assistant Examiner* — Melvin H Pollack

(57) ABSTRACT

Methods and apparatus for enabling a protected circuit path to be created efficiently are disclosed. In accordance with one embodiment of the present invention, a method for creating a protected circuit path within an optical network system includes identifying a first node, a second node, and a third node. Once the nodes are identified, a pseudo link or a virtual link may be created between the second node and the third node. A first circuit path is then routed between the first node and the second node, and a second circuit path which protects that first circuit path is routed between the first node and the third node using the pseudo link.

23 Claims, 15 Drawing Sheets

U.S. PATENT DOCUMENTS

| | | | |
|---|---|---|---|
| 6,542,468 B1 | 4/2003 | Hatakeyama | |
| 6,549,513 B1 | 4/2003 | Chao et al. | |
| 6,553,034 B2* | 4/2003 | Chan et al. | 370/397 |
| 6,556,319 B2* | 4/2003 | Feinberg et al. | 398/5 |
| 6,567,194 B1* | 5/2003 | Badr | 398/1 |
| 6,587,241 B1* | 7/2003 | Saleh | 398/92 |
| 6,606,297 B1* | 8/2003 | Magill et al. | 370/216 |
| 6,616,350 B1* | 9/2003 | de Boer et al. | 398/9 |
| 6,643,464 B1 | 11/2003 | Roorda et al. | |
| 6,646,990 B1 | 11/2003 | Gray et al. | |
| 6,658,013 B1* | 12/2003 | de Boer et al. | 370/404 |
| 6,671,819 B1 | 12/2003 | Passman et al. | |
| 6,683,891 B1* | 1/2004 | Mazzurco et al. | 370/222 |
| 6,707,820 B1* | 3/2004 | Arndt et al. | 370/395.2 |
| 6,721,502 B1* | 4/2004 | Al-Salameh et al. | 398/3 |
| 6,728,205 B1* | 4/2004 | Finn et al. | 370/217 |
| 6,744,775 B1 | 6/2004 | Beshai et al. | |
| 6,751,190 B1 | 6/2004 | Swallow | |
| 6,765,880 B1 | 7/2004 | Hillard et al. | |
| 6,768,718 B1 | 7/2004 | Beshai et al. | |
| 6,775,305 B1* | 8/2004 | Delvaux | 370/535 |
| 6,775,477 B2* | 8/2004 | Badr | 398/1 |
| 6,804,712 B1 | 10/2004 | Kracht | |
| 6,813,241 B1 | 11/2004 | Wang et al. | |
| 6,813,242 B1* | 11/2004 | Haskin et al. | 370/229 |
| 6,816,680 B2* | 11/2004 | Purse et al. | 398/5 |
| 6,826,158 B2* | 11/2004 | Seaman et al. | 370/254 |
| 6,895,091 B1 | 5/2005 | Elliott et al. | |
| 6,917,759 B2* | 7/2005 | de Boer et al. | 398/5 |
| 6,952,395 B1* | 10/2005 | Manoharan et al. | 370/219 |
| 6,959,000 B1* | 10/2005 | Lee | 370/404 |
| 6,975,588 B1* | 12/2005 | Katukam et al. | 370/222 |
| 6,980,711 B2* | 12/2005 | Feinberg et al. | 385/16 |
| 7,006,500 B1* | 2/2006 | Pedersen et al. | 370/394 |
| 7,012,887 B2* | 3/2006 | Zhu et al. | 370/216 |
| 7,012,917 B2* | 3/2006 | Brolin et al. | 370/352 |
| 7,016,312 B1* | 3/2006 | Semaan et al. | 370/254 |
| 7,016,379 B2* | 3/2006 | Falkenstein et al. | 370/535 |
| 7,023,851 B2* | 4/2006 | Chakravorty | 370/392 |
| 7,031,253 B1* | 4/2006 | Katukam et al. | 370/222 |
| 7,035,208 B1* | 4/2006 | Najda et al. | 370/227 |
| 7,042,839 B2* | 5/2006 | Stewart et al. | 370/227 |
| 7,058,011 B1* | 6/2006 | Stearns et al. | 370/219 |
| 7,058,012 B1* | 6/2006 | Chen et al. | 370/222 |
| 7,093,024 B2* | 8/2006 | Craddock et al. | 709/238 |
| 7,095,714 B2* | 8/2006 | Suetsugu et al. | 370/222 |
| 7,120,359 B2* | 10/2006 | Way | 398/59 |
| 7,130,264 B2* | 10/2006 | Wiebe et al. | 370/225 |
| 7,167,443 B1* | 1/2007 | Dantu et al. | 370/218 |
| 7,167,444 B1* | 1/2007 | Afferton | 370/222 |
| 7,170,851 B1* | 1/2007 | Chen et al. | 370/222 |
| 7,173,927 B2* | 2/2007 | Kumar et al. | 370/352 |
| 7,206,281 B2* | 4/2007 | Chen et al. | 370/222 |
| 7,209,478 B2* | 4/2007 | Rojas et al. | 370/360 |
| 7,227,837 B1* | 6/2007 | Bi et al. | 370/217 |
| 7,260,059 B2* | 8/2007 | Grover et al. | 370/222 |
| 7,260,091 B2* | 8/2007 | Yamamoto | 370/357 |
| 7,274,869 B1* | 9/2007 | Pan | 398/5 |
| 7,280,529 B1* | 10/2007 | Black et al. | 370/352 |
| 7,308,198 B1* | 12/2007 | Chudak et al. | 398/58 |
| 7,333,512 B2* | 2/2008 | Kumar et al. | 370/473 |
| 7,345,991 B1* | 3/2008 | Shabtay et al. | 370/221 |
| 7,352,758 B2* | 4/2008 | Makam et al. | 370/405 |
| 7,352,966 B2* | 4/2008 | Chaudhuri et al. | 398/5 |
| 7,353,293 B2* | 4/2008 | Hipfinger | 709/239 |
| 7,366,989 B2* | 4/2008 | Naik et al. | 715/736 |
| 7,385,918 B2* | 6/2008 | Takagi | 370/222 |
| 7,426,179 B1* | 9/2008 | Harshavardhana et al. | 370/219 |
| 7,450,497 B2* | 11/2008 | Trudel et al. | 370/224 |
| 7,502,315 B2* | 3/2009 | Huang et al. | 370/228 |
| 7,505,683 B1* | 3/2009 | Lemieux et al. | 398/4 |
| 7,573,814 B1* | 8/2009 | Luft et al. | 370/223 |
| 2002/0004843 A1 | 1/2002 | Andersson et al. | |
| 2002/0131431 A1* | 9/2002 | Wank et al. | 370/403 |
| 2002/0133698 A1* | 9/2002 | Wank | 713/151 |
| 2003/0009599 A1* | 1/2003 | Lee et al. | 709/251 |
| 2003/0021222 A1 | 1/2003 | Boer et al. | |
| 2003/0063613 A1 | 4/2003 | Carpini et al. | |
| 2003/0072057 A1* | 4/2003 | Frigo et al. | 359/125 |
| 2003/0076816 A1 | 4/2003 | Naranjo et al. | |
| 2003/0142678 A1* | 7/2003 | Chan et al. | 370/395.1 |
| 2003/0169692 A1* | 9/2003 | Stern et al. | 370/242 |
| 2003/0185201 A1* | 10/2003 | Dorgan | 370/352 |
| 2003/0185562 A1* | 10/2003 | Feinberg et al. | 398/5 |
| 2004/0208554 A1* | 10/2004 | Wakai et al. | 398/54 |
| 2006/0140118 A1* | 6/2006 | Alicherry et al. | 370/235 |
| 2009/0190636 A1* | 7/2009 | Mui et al. | 375/222 |

OTHER PUBLICATIONS

Zhang, Yuna and Yang, Oliver. "A Distributed Tree Algorithms for WDM Network Protection/Restoration," 5th Intl. Conference on High Speed Networks and Multimedia Communications, Jul. 3-5, 2002, pp. 289-294.*

Stoll, Detlef et al. "Metropolitan DWDM: A Dynamically Configurable Ring for the KomNet Field Trial in Berlin," IEEE Communications Magazine, vol. 39, Issue 2, Feb. 2001, pp. 106-113.*

Ayandeh, Siamack. "Convergence of Protection and Restoration in Telecommunication Networks," Photonic Network Communications, vol. 4, Nos. 3-4, Jul. 2002, pp. 237-250.*

Wuttisittikulkij, L. and O'Mahony, M.J. "Multiwavelength Self-Healing Ring Transparent Networks," IEEE Global Telecommunications Conference, vol. 1, Nov. 14-16, 1995, pp. 45-49.*

Hague, Izaz, et al. "Self-Healing Rings in a Synchronous Environment," IEEE LTS, vol. 2, Issue 4, Nov. 1991, pp. 30-37.*

Kuhfeld, J. et al. "Definitions of Managed Objects for Synchronous Optical Network (SONET) Linear Automatic Protection Switching (APS) Architectures," RFC 3498, Mar. 2003, pp. 1-43.*

Kane, L. "Cabletron's VLS Protocol Specification," RFC 2642, Aug. 1999, pp. 1-95.*

Gencata, A. and Mukherjee, B. "Virtual-Topology Adaptation for WDM Mesh Networks under Dynamic Traffic," IEEE/ACM Transactions on Networking, vol. 11, Issue 2, Apr. 2003, pp. 236-247.*

Stamatelakis, D. and Grover, W.D. "IP Layer Restoration and Network Planning Based on Virtual Protection Cycles," IEEE Journal on Selected Areas in Communications, vol. 18, Issue 10, Oct. 2000, pp. 1938-1949.*

Banerjee, A. et al. "Generalized Multiprotocol Label Switching: An Overview of Signaling Enhancements and Recovery Techniques," IEEE Communications Magazine, vol. 39, Issue 7, Jul. 2001, pp. 144-151.*

Sato, K. et al. "Network Reliability Enhancement with Virtual Path Strategy," IEEE Global Telecommunications (Globecom) Conference and Exhibition—Communications: Connecting the Future, vol. 1, Dec. 5, 1990, pp. 464-469.*

Office Action in counterpart Canadian Application No. 2,521,518, mailed Aug. 2, 2010.

* cited by examiner

COMPUTING A PATH FOR AN OPEN ENDED UNI-DIRECTIONAL PATH PROTECTED SWITCHED RING

BACKGROUND OF THE INVENTION

1. Field of Invention

The present invention relates generally to network systems. More particularly, the present invention relates to enabling path protected circuits to be created within open ended unidirectional path protected switched rings that have nodes which are associated with multiple vendor or service provider equipment networks.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET), is becoming more prevalent. A SONET network is an example of a time division multiplexed (TDM) network. TDM networks generally allocate single lines to be used amongst multiple users, or customers of data communication services. The single lines may each be divided into slots of time during which each user has access to the single lines.

A network such as a TDM network is generally designed to ensure that information may be transferred between nodes within the network. Often, within a network, information is transferred between two specified nodes, i.e., a source node which sends information and a destination node which receives information. When information is to be sent between a source node and a destination node, a circuit path between the two nodes must be computed so that leased line services may be provided.

In order to increase the likelihood that data will be successfully transferred between a source node and a destination node, a circuit path between the source node and the destination node may be protected. A protected circuit path is a circuit path which includes redundancy that generally allows data to be transferred even in the event of a nodal failure or a link failure. A protected path may generally include protected links, e.g., links with 1+1 protection, and unprotected links. When unprotected links are included in a protected circuit path, an alternate circuit path is associated with the protected circuit path. If a primary circuit path between a source node and a destination node includes unprotected links, then an alternate circuit path is needed between the source node and the destination node in order for the circuit path between the source node and the destination node to be protected. The alternate circuit path effectively serves as a "back up" to a primary circuit path which includes unprotected links in the event that the primary circuit path fails. By way of example, when a primary circuit path suffers either a nodal failure or a failure of a link, information which was to be sent from a source node to a destination node on the primary circuit path may instead be sent from the source node to the destination node on the alternate circuit path.

Many networks include source nodes and destination nodes that are a part of a uni-directional path protected switched ring (UPSR). FIG. 1 is a diagrammatic representation of a UPSR. A UPSR 10 includes a multiplicity of nodes 20a-d which are communicably connected by unprotected links 22a-d. Specifically, nodes 20a, 20b are linked by link 22a, nodes 20b, 20c are linked by link 22b, nodes 20c, 20d are linked by link 22c, and nodes 20d, 20a are linked by link 22d.

When node 20a is a source node and node 20c is a destination node, then information may be sent from source node 20a to destination node 20c on a circuit path. When the circuit path on which the information is to be sent is to be a protected circuit path, since links 22a-d are unprotected links, both a primary circuit path 24 and an alternate circuit path 26 between source node 20a and destination node 20c are needed. Alternate circuit path 26 essentially protects primary circuit path 24, since alternate circuit path 26 may be used to transmit or otherwise provide information from source node 20a to destination node 20c if there is a failure associated with primary circuit path 24.

Primary circuit path 24 includes link 22a which is effectively a segment between source node 20a and node 20b. Source node 20b may be considered to be a segment destination node for the segment which includes link 22a. Link 22b, which is effectively a segment between node 20b and destination node 20c, is also included in primary circuit path 24. Alternate circuit path 24 includes links 22d, 22c and passes through node 20d.

Often, nodes 20a-d may be from different vendor equipment networks, e.g., at least one of nodes 20a-d may be of a different type or owned by a different service provider from other nodes 20a-d. For example, destination node 20c may be different from nodes 20a, 20b, 20d in that destination node 20c may be of a different type, or owned by a different service provider, than nodes 20a, 20b, 20d which may be of the same type, or owned by a common service provider. When destination node 20c is different from nodes 20a, 20b, 20d, primary circuit path 24 and alternate circuit path 26 are "stitched together" which involves a highly laborious process that includes going to each appropriate node 20a-d in each circuit path 24, 26 and trying to create an individual connection. Once individual connections are created, as for example by a service provider, then a set of connections is pieced together to form circuit paths 24, 26. Network management systems that are used to create circuit paths 24, 26 may generally only compute circuit paths 24, 26 to one end point, e.g., node 20c, when substantially all elements associated with UPSR 10 or, more generally, the network are known.

Creating circuit paths 24, 26 by stitching together connections is difficult, time-consuming and often inaccurate, or otherwise prone to errors. Since the speed with which circuit paths 24, 26 may be created and the transmission of information or data on appropriate paths is typically critical, the time associated with stitching together circuit paths 24, 26 and the propensity of errors associated with stitching together circuit paths 24, 26 may be unacceptable in many cases.

Therefore, what is needed is a method and an apparatus for enabling protected circuit paths to be efficiently and accurately created across multiple vendor or multiple service provider equipment networks. That is, what is desired is a system which allows path protected circuit to be substantially automatically computed within a multiple vendor or multiple service provider equipment network.

SUMMARY OF THE INVENTION

The present invention relates to a system for enabling a protected circuit path to be created efficiently. In accordance with one embodiment of the present invention, a method for creating a protected circuit path within an optical network system includes identifying a first node, a second node, and a third node. Once the nodes are identified, a pseudo link or a virtual link may be created between the second node and the third node. A first circuit path is then routed between the first node and the second node, and a second circuit path which protects that first circuit path is routed between the first node and the third node using the pseudo link.

In one embodiment, the first node is a source, the second node is a primary destination, and the third node is a secondary destination. In another embodiment, the first node is a destination, the second node is a primary source, and the third node is a secondary source.

The ability to compute a protected circuit path which either originates on two end points and terminates at one end point or originates at one end point and terminates at two end points allows the protected circuit path to be efficiently routed. When a request for a path protected circuit specifies a single source node and a single destination node that are of different "types," i.e., when a source node and a destination node are either associated with different vendors or different service providers, and other nodes in the network are of the same type as the source node, eliminating the destination node from a circuit path routing process allows a path protected circuit to be efficiently created when such a circuit is feasible. Eliminating the destination node effectively allows two destination end points to be associated with the source node. The computation of a path protected circuit then does not involve a time-consuming process of entering each node that is ultimately associated with the path protected circuit and trying to create individual connections. Connecting the two end points with a pseudo link enables an alternate path to be substantially guaranteed when a primary path is computed.

According to another aspect of the present invention, a method for creating a protected circuit path within a network includes receiving a request to route an open-ended circuit and creating a pseudo link between the second network element and the third network element. The pseudo link may be used to substantially validate whether a primary path is protectable. The request specifies a first network element, a second network element, and a third network element. A first path is computed between the first network element and the second network element, and a second path that substantially protects the first path is computed to substantially include the first network element and the third network element. Computing the second path includes using the pseudo link in a computational process. In one embodiment, the second network element and the third network element are linked to a fourth network element, and the first path and the second path are arranged to form the protected circuit path that is defined between the first network element and the fourth network element.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
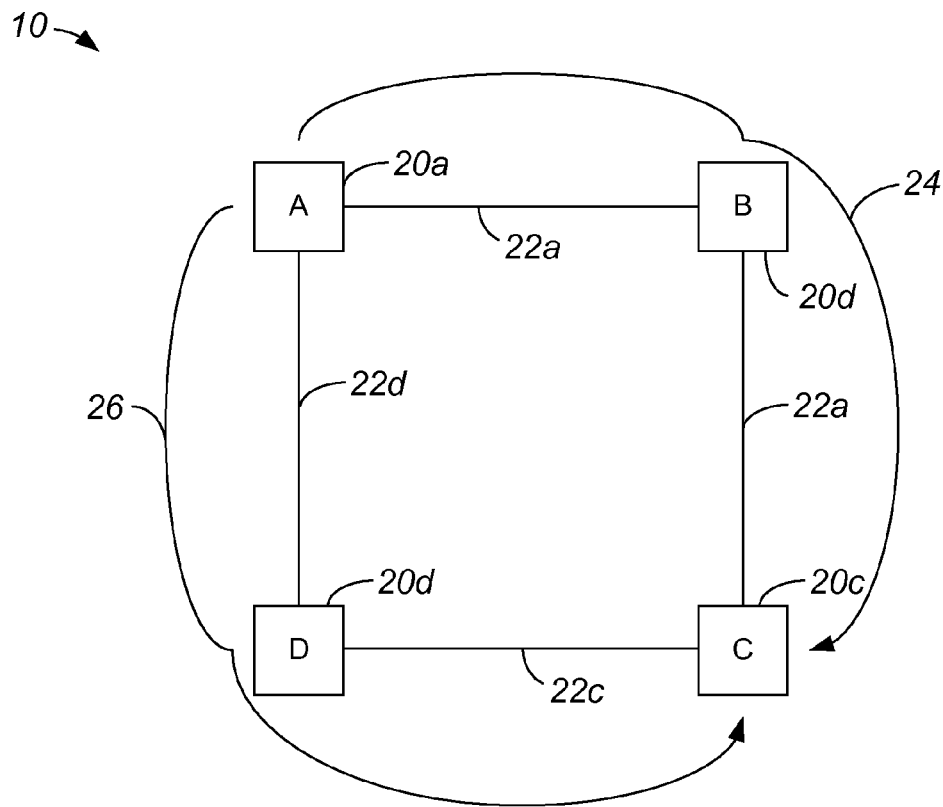
FIG. 1 is a diagrammatic representation of a unidirectional path switched ring (UPSR).

Creating protected circuit paths within a network such as a network which includes a uni-directional path protected switched ring (UPSR) is often a time-consuming and error prone process, particularly when nodes or network elements in the UPSR may be associated with different vendors or different service providers. When nodes of a UPSR are associated with different vendors or different service providers, protected circuit paths are generally created by entering each node within the paths and creating individual connections on fibers to subsequent nodes. The speed with which protected circuit paths are created is typically important, as is the accuracy with which the paths are created. Hence, both the relatively slow speed with which protected circuit paths are created in a UPSR which includes nodes associated with multiple vendors or multiple service providers, and the errors in the circuit paths, is often intolerable.

In order to improve the efficiency associated with creating circuit paths, e.g., protected circuit paths, across multiple vendor or multiple service provider equipment networks, a user may specify two end points or two starting points within a portion of a network that is associated with a common vendor or a common service provider. That is, a network management system may substantially automatically compute a path protected circuit which either has two associated end points or two associated starting points. When a source node and a destination node within a network are of different "types," i.e., when a source node and a destination node are either associated with different vendors or different service providers, and other nodes in the network are of the same type as the source node, by substantially "removing" the destination node from a circuit path routing process, a service provider may readily create a path protected circuit when such a circuit is feasible. Removing the destination node effectively allows two end points, each of which may be in communication with the destination node across links or fibers, to be associated with the source node. Connecting the two end points with a "pseudo link," or a virtual link, enables an alternate path to be substantially guaranteed when a primary path is computed. The computation of a protected circuit path by removing an original destination node and connecting two end points with a pseudo link is efficient and not prone to errors.

Further, the use of a pseudo link effectively enables a path protected circuit which either ends on two end points or originates at two end points to be created, e.g., by a service provider or a network administrator who uses a network management system which includes such capability. By effectively linking the two end points using a pseudo link, a path protected circuit that either sends or originates at the two end points may be created. Hence, a path between a source and a first destination point may be protected by a path between the source and a second destination point. Similarly, a path between a first source point and a destination may be protected by a path between a second source point and the destination.

Figure 2:
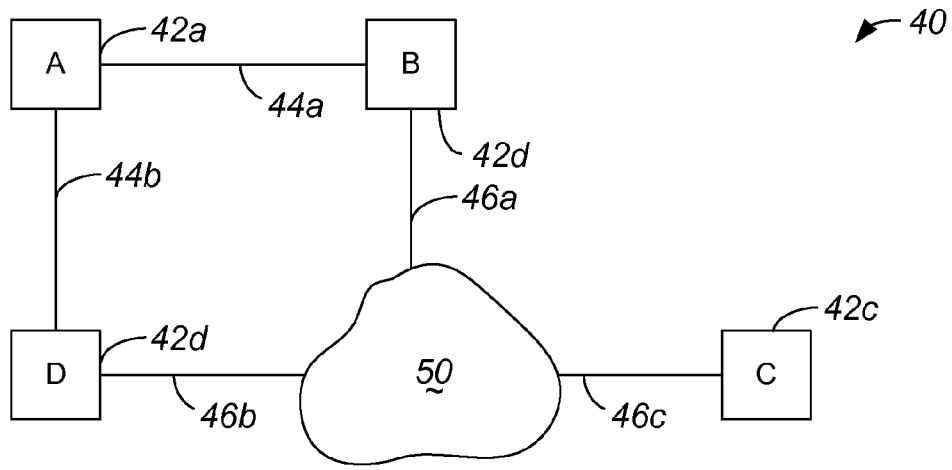
FIG. 2 is a diagrammatic representation of a network which includes a pseudo link representation in accordance with an embodiment of the present invention.

A pseudo link facilitates the computation of a protected path in a network which includes either a start node or an end node which is of a different type than substantially all other nodes that are to be associated with the protected path. In one embodiment, a pseudo link may effectively be considered to be an overall connection which allows an overall end node, for example, to be "connected" to two end points substantially without having to stitch together a path from each of the two end points to the overall end node. With reference to FIG. 2, a pseudo link representation will be described in accordance with an embodiment of the present invention. A network 40, e.g., an optical network, includes nodes 42a-d. When node 42c is of a different type than nodes 42a, 42b, 42d, then node 42c may effectively be separated from nodes 42a, 42b, 42d during a path routing process.

If node 42c is a start node, e.g., an originating node, node 42c is isolated from the rest of network 40, and a pseudo link representation 50 is used to enable a connection to effectively be made between nodes 42b, 42d using pseudo link representation 50 and link segments 46a, 46b. Nodes 42b, 42d then become two new sources, when node 42a is a destination. Links 44a, 44b allow paths to be routed between node 42b and node 42a, as well as between node 42d and node 42a such that one path protects the other. Once such paths are routed, an overall protected path between overall source node 42c and end node 42a is substantially routed.

If node 42c is an end node, then nodes 42b, 42d effectively become two new destination nodes once pseudo link representation 50 and link segments 46a-c are in place. Once a path is routed from node 42a, when node 42a is a source node, to node 42b over link 44a, the presence of pseudo link representation 50 and link segments 44a, 44b allows an alternate path which protects that path between node 42a and node 42b to be identified. By creating a protected path between node 42a and node 42b that uses pseudo link representation 50, a path between node 42a and node 42c is effectively created.

Figure 3:
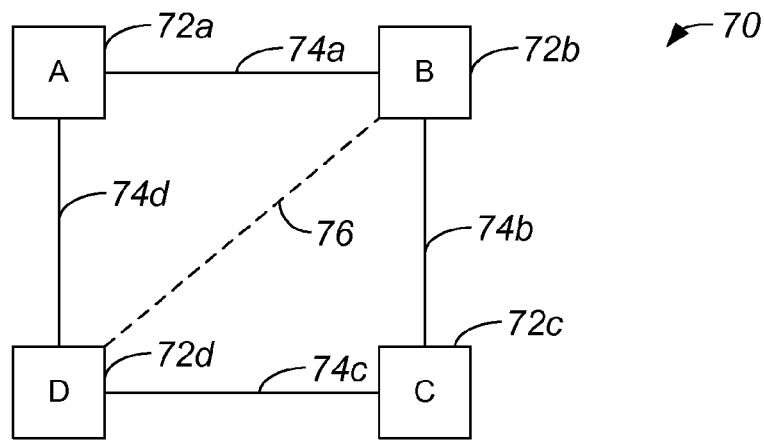
FIG. 3 is a diagrammatic representation of a network, e.g., a UPSR, with a pseudo link in accordance with an embodiment of the present invention.

In general, instead of including pseudo link representation 50 in network 40, an actual pseudo link may replace pseudo link representation 50, and link segments 46a-c. That is, a pseudo link may be positioned between node 42b and node 42d in order to provide a connection between node 42b and node 42d, in lieu of pseudo link representation 50 and link segments 46a-c. FIG. 3 is a diagrammatic representation of a network, e.g., a UPSR, with a pseudo link in accordance with an embodiment of the present invention. A UPSR 70 includes nodes 72a-d and links 74. When node 72a is a source node and node 72c is a destination node, then a protected circuit path may be routed between source node 72a and destination node 72c. In the described embodiment, nodes 72a, 72b, 72d are of the same type, e.g., from the same vendor or associated with the same network service provider, while destination node 72c is of a different type. In one embodiment, destination node 72c may be a representation of a plurality of nodes, e.g., destination node 72c may effectively be a node within another group of nodes which is suitable for receiving a signal from nodes 72b, 72d.

Since node 72c is not of the same type as nodes 72a, 72b, 72d, in order to efficiently develop or determine a protected circuit path, node 72c is effectively rendered inaccessible or unavailable to the path routing or circuit provisioning process that is used to develop the protected circuit path. The path routing process removes node 72c and positions a pseudo link 76 between node 72b and node 72d. Pseudo link 76 serves to "replace" node 72c within UPSR, as well as links 74b, 74c, when a network management system attempts to create a circuit path within network 70. Once pseudo link 76 is in place, node 72b becomes a primary destination node and node 72d becomes a secondary destination node that are each associated with source node 72a. In other words, with respect to an open ended UPSR circuit, source node 72a is a source point while node 72b becomes a primary end point and node 72d becomes a secondary end point. The presence of pseudo link 76 generally allows a protected path to be developed, as will be discussed below with reference to FIGS. 11a-h. Specifically, in one embodiment, pseudo link 76 enables a path between node 72a and node 72d to effectively protect a path between node 72a and node 72b, since pseudo link 76 and a link 74d may be considered as a path segment which protects the path segment formed from a link 74a. It should be appreciated that when a path between node 72a and node 72b is established, in order to complete an overall path from node 72a to node 72c, an open-ended UPSR circuit may be specified where node 72b and node 72d are source nodes, and node 72c is a destination node.

When UPSR 70 includes an openended UPSR circuit or an open-ended sub-network connection protection (SNCP) circuit, there are two paths which originate from source node 72a. Specifically, one path would be from source node 72a to primary end point 72b, while the other path would be from source node 72a to secondary end point 72d. Source node 72a includes a bridge (not shown) that enables data or information traffic to be sent on both paths. It should be appreciated that for bi-directional circuits, source node 72a may also include a selector for reverse traffic from an end point 72b, 72d to source node 72a.

Figure 4:
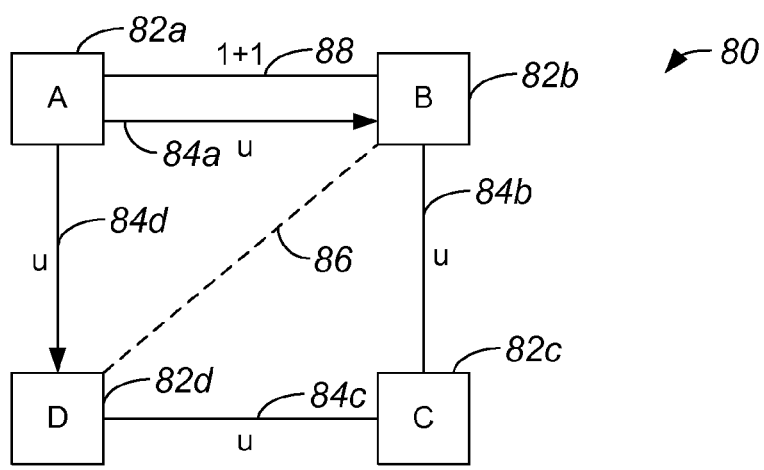
FIG. 4 is a diagrammatic representation of a network which includes nodes which are linked by more than one type of link in accordance with an embodiment of the present invention.

Links 74a-d may all be unprotected links. Alternatively, links 74a-d may be of different configurations, e.g., some may have 1+1 protection while others are unprotected. In some cases, some nodes may be in communication over more than one kind of link. With reference to FIG. 4, a UPSR which includes nodes which are linked by more than one type of link will be described in accordance with an embodiment of the present invention. A UPSR 80 includes nodes 82a-d and unprotected links 84a-d. Node 82a is linked to node 82b by unprotected link 84a and, additionally, by a link 88 which has 1+1 protection. Node 82a is a source node and node 82c is a destination node that is of a different type from nodes 82a, 82b, 82d. Hence, node 82c may effectively be removed from UPSR 80 as a part of a path routing process for a path protected circuit, while a pseudo link 86 may be inserted as a linkage between node 82b and node 82d. Pseudo link 86 enables a path protected circuit to be efficiently routed.

Once pseudo link 86 is in place, then a path routing process may attempt to route a primary circuit path between source node 82a and primary end point 82b and a secondary circuit path between source node 82a and secondary end point 82d. It should be appreciated that once information is received at end points 82b, 82d, destination node 82c effectively knows which fibers on which to expect a signal to be received, as end points 82b, 82d puts task signals on appropriate fibers, i.e., fibers specified by a customer. A primary path between source node 82a and primary end point 82b includes unprotected link 84a, and a secondary path between source node 82a and secondary end point 82b includes unprotected link 84b. Although link 88 offers line level protection between source node 82a and primary end point 82b, selecting link 88 instead of unprotected link 84a effectively wastes bandwidth associated with transmitting information between source node 82a and primary end point 82b. That is, line level protection is not necessary when there is path level protection, as the secondary path serves to protect the primary path when there is a failure associated with the primary path.

Source node 82a generally broadcasts information traffic on both the primary path and the secondary path. The primary path, which ultimately enables data to be transmitted from source node 82a to destination node 82c, includes unprotected link 84a, and also effectively includes unprotected link 84b. The secondary path, which also enables data to be transmitted from source node 82a to destination node 82c, includes unprotected link 84d and unprotected link 84c.

Figure 5:
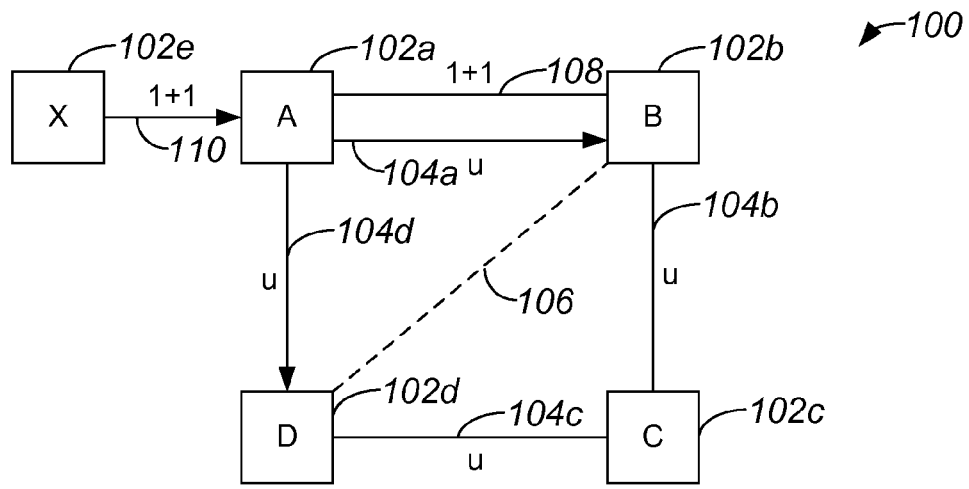
FIG. 5 is a diagrammatic representation of a network which includes both unprotected links and links with 1+1 protection in accordance with an embodiment of the present invention.

Although the use of line level protection is not always necessary when there is path level protection available, links with line level protection may generally be included in a path protected circuit within which there is also path level protection. For example, when there are nodes within a network which may substantially only be in communication over a link with line level protection, then it may be necessary to include such a link in an overall protected circuit path. FIG. 5 is a diagrammatic representation of a network which includes both unprotected links and links with 1+1 protection in accordance with an embodiment of the present invention. A network 100 includes nodes 102a-e and unprotected links 104a-d. Network 100 also includes links 108, 110 which have 1+1 protection. Specifically, node 102e and node 102a are linked by link 110 which has 1+1 protection. Node 102a is linked to node 102b by unprotected link 104 and link 108 which has 1+1 protection.

When a protected circuit path is to be found between a source node 102e and a destination node 102c, and destination node 102c is either from a different vendor or associated with a different service provider than nodes 102a, 102b, 102d, 102e, destination node 102c may effectively be replaced in a path routing algorithm by a pseudo link 106 which forms a virtual connection between node 102b and node 102d. Once pseudo link 106 is in place, finding a protected circuit path between source node 102e and destination node 102c involves finding a circuit path from source node 102e to node 102b, and finding a circuit path from source node 102e to node 102d.

Link 110 is substantially the only link between source node 102e and any other node, namely node 102a, within network 100 which has available bandwidth for transmitting a signal. Since link 110 has 1+1 protection, the selection of link 110 for providing a signal from source node 102e to node 102a is appropriate for a protected circuit path between source node 102e and destination node 102c.

For a primary circuit path which includes a circuit path from source node 102e to node 102b, links 104a, 108 are available. Although link 108 has 1+1 protection, as previously mentioned, when a protected path is desired, choosing a protected link 108 may result in wasted bandwidth, i.e., it is not efficient to choose link 108 which has 1+1 protection when unprotected link 104a is available. As such, a primary circuit path from source node 102e that includes node 102b also includes link 110 and link 104a.

A secondary circuit path from source node 102e to node 102d includes link 110 and link 104d. The use of pseudo link 106 effectively allows the secondary circuit path to be created such that the primary circuit path is protected. Specifically, a primary path from source node 102e to destination node 102c which passes through node 102b is substantially protected by a secondary path from source node 102e to destination node 102c which passes through node 102d.

Figure 6:
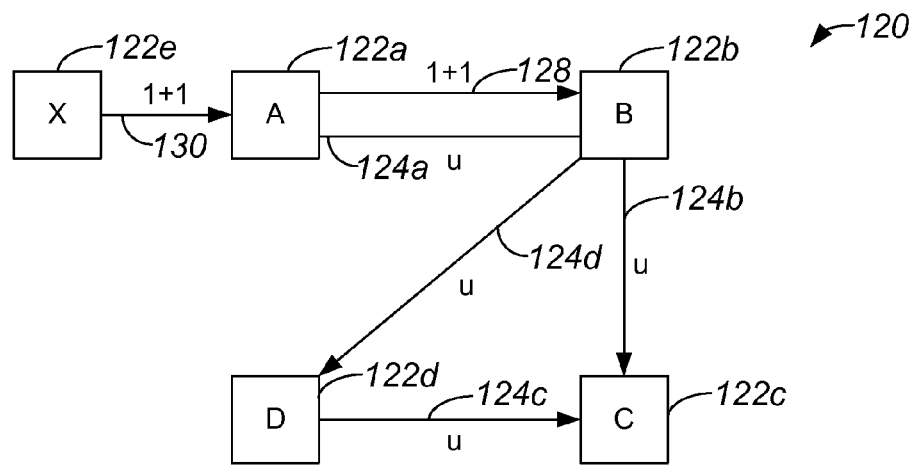
FIG. 6 is a diagrammatic representation of a network in which the choice of a link with 1+1 protection is made in lieu of an available unprotected link for use in a primary circuit path in accordance with an embodiment of the present invention.

In some cases, a protected circuit path may include links with 1+1 protection even in the event that suitable unprotected links are available. The choice of links with 1+1 protection for use in a primary circuit path of a protected circuit path even when unprotected links are available may be made when there is no unprotected link available for use in a secondary circuit path of the protected circuit path. Referring next to FIG. 6, the choice of a link with 1+1 protection in lieu of an available unprotected link for use in a primary circuit path will be described in accordance with an embodiment of the present invention. Nodes 122a-e are included in a network 120, with node 122e being a source node and node 122c being a destination node. As shown, source node 122e and node 122a are in communication through, or linked by, a link 130 which has 1+1 protection. Node 122a is further in communication with node 122b across a link 128 which has 1+1 protection and an unprotected link 124a.

When a protected circuit path between source node 122e and destination node 122c is desired, the protected circuit path passes through node 122b, as there is no path to destination node 122c which does not pass through node 122b. Since a protected path is desired, link 128 is chosen to substantially connect node 122a and node 122b. As will be appreciated by those skilled in the art, link 124a may not be chosen since there is no corresponding unprotected link which is suitable for protecting link 124a. Once a segment of a protected circuit path is determined to include links 130, 128, then a link 124b may become part of a primary circuit path and links 124c, 124d may be come part of a secondary circuit path.

Figure 7:
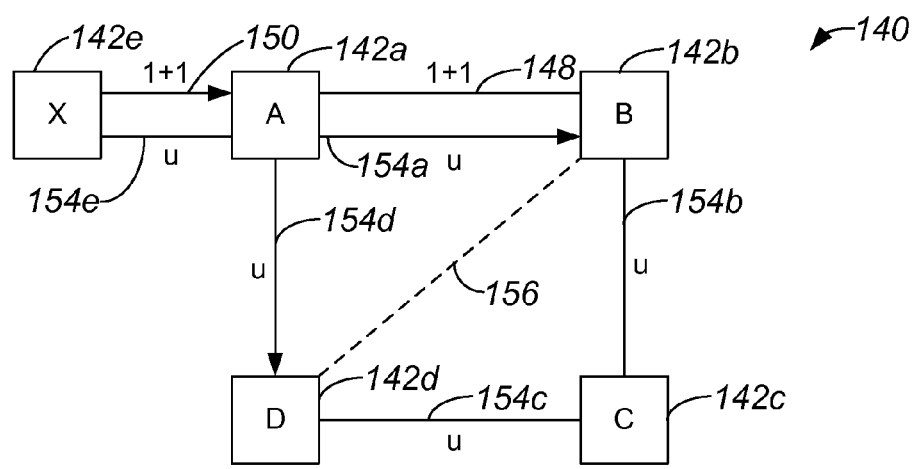
FIG. 7 is a diagrammatic representation of a network which includes a plurality or unprotected links and a plurality of links with 1+1 protection, as well as a node which is of a different type than all other nodes in the network in accordance with an embodiment of the present invention.

FIG. 7 is a diagrammatic representation of a network which includes a plurality or unprotected links and a plurality of links with 1+1 protection, as well as a node which is of a different type than all other nodes in the network in accordance with an embodiment of the present invention. A network 140 includes nodes 142a-e and unprotected links 154a-e. Network 140 also includes links 148, 150 which have 1+1 protection. When node 142e is a source node and node 142c, which is of a different type than nodes 142a, 142b, 142d, 142e, then a pseudo link 156 is created between nodes 142b, 142d. In addition, nodes 142b, 142d become endpoints of path segments which are to originate at source node 142e.

Source node 142e is in communication with node 142a across unprotected link 154e and link 150, which has 1+1 protection. Since a protected circuit path is to be created between source node 142e and destination node 142c, link 150 is chosen over link 154e. Link 154a is then chosen between nodes 142a, 142b since link 154d, which is between nodes 142a, 142d, is suitable for protecting link 154a. In general, by substantially ensuring an unprotected path to node 142b from node 142a, then a protected circuit path between source node 142e and destination node 142c may be found.

Figure 8:
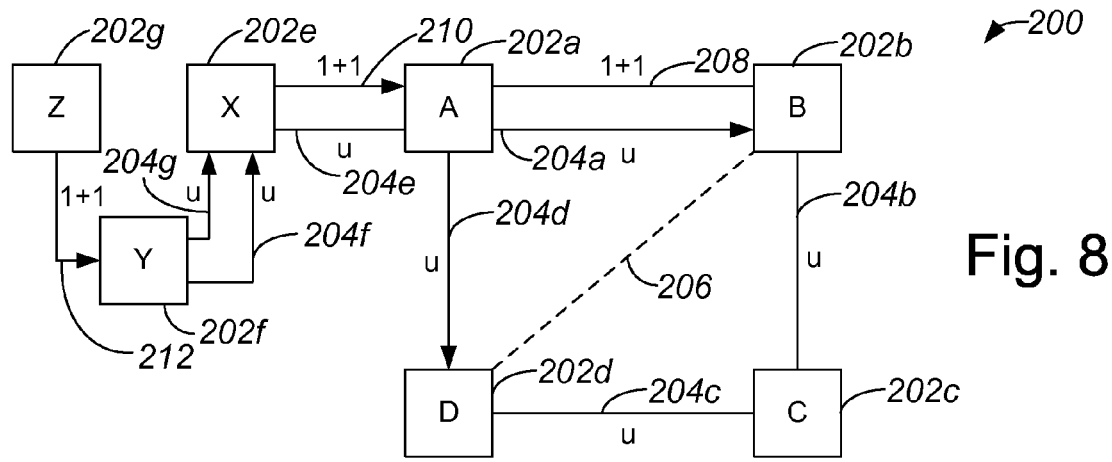
FIG. 8 is a diagrammatic representation of a network which includes a plurality or unprotected links and a plurality of links with 1+1 protection, as well as a node which is of a different type than all other nodes in the network in accordance with another embodiment of the present invention.

Some circuit paths between a source node and a destination node may include a plurality of links or segments with 1+1 protection and a plurality of unprotected links or segments. FIG. 8 is a diagrammatic representation of a network which includes a plurality or unprotected links and a plurality of links with 1+1 protection, as well as a node which is of a different type than all other nodes in the network in accordance with another embodiment of the present invention. When a node 202c is of a different type than substantially all other nodes 202a, 202b, 202d-g in a network 200, and node 202c is a destination node associated with a source node 202g, node 202c may be removed from consideration during a path provisioning process, and a pseudo link 206 may be added between end points 202b, 202d which serve as alternate destination nodes.

In routing a protected circuit path between source node 202g and ultimately node 202c through nodes 202b, 202d, since source node 202g only has one link 212 with available bandwidth, link 212 is used as a part of the circuit path. Hence, between source node 202g and node 202f, signals will be sent on line 212 which has 1+1 protection. Between node 202f and node 202e, unprotected links 204f, 204g are both used as link 204g provides protection for link 204f, and vice versa.

While an unprotected link 204e has available bandwidth and exists between node 202e and node 202a, since there is effectively no link available to protect link 204e, link 210 is used between node 202e and node 202a, even though link 210 has 1+1 protection. From node 202a to node 202b, unprotected link 204a is chosen over link 208 because unprotected link 204d between node 202a and node 202d effectively serves to protect link 204a. The inclusion of pseudo link 206 essentially allows a circuit provisioning process to consider the segment formed from link 204d and pseudo link 206 as protecting the segment formed from link 204a. Hence, it may be said that the overall path from node 202g to node 202d protects the path from node 202g to node 202b. It should be appreciated that once a signal reaches nodes 202d, 202b, node 202c may determine which of nodes 202b, 202d to accept the signal from. That is, node 202c may decide whether to use the signal received from node 202b over link 204b, or to use the signal received from node 202d over link 204c.

Figure 9:
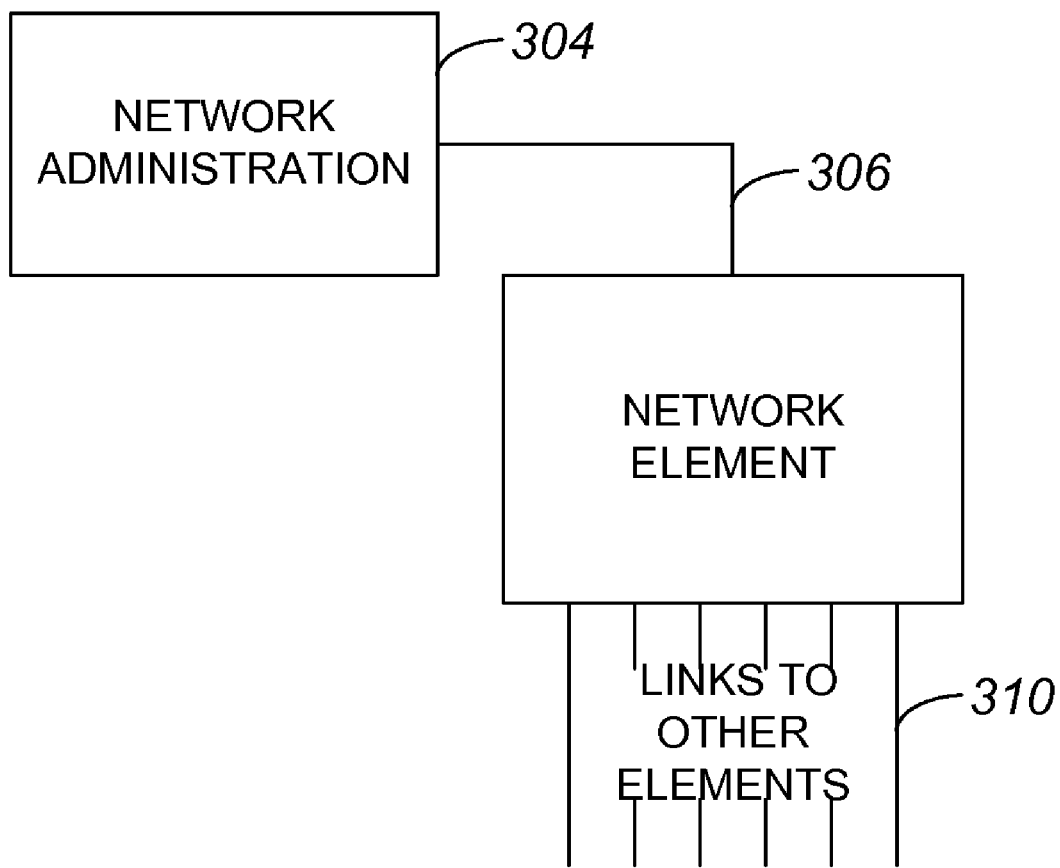
FIG. 9 is a diagrammatic representation of a network element that is coupled to network administration capability in accordance with an embodiment of the present invention.

A node or, more generally, a network element which includes a network management system may be used to create or provision a circuit. FIG. 9 is a diagrammatic representation of a network element that is coupled to network administration capability in accordance with an embodiment of the present invention. A network element 300, e.g., a node, includes modules (not shown) which interact during circuit creation. Such modules, which may be implemented as computer code devices included on a computing device (not shown) that is part of or associated with network element 300, typically provide a network management system which allows a circuit path to be computed. A network administrator or user 304 interacts with network element 300, as for example through a graphical user interface (not shown), to provide inputs that are necessary for creating a circuit within a network to which network element 300 is linked through links 310.

Figure 10A:
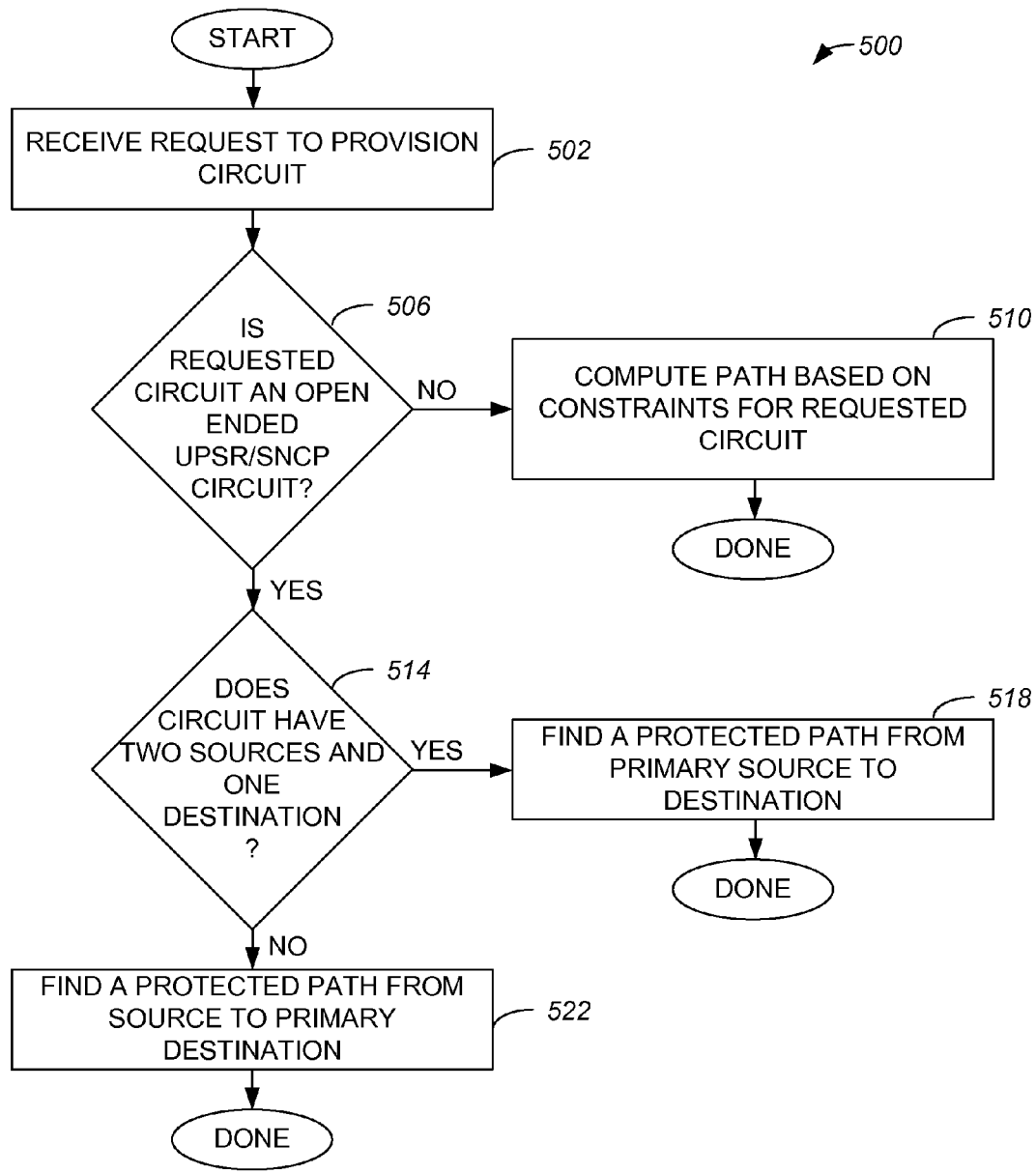
FIG. 10a is a process flow diagram which illustrates the general steps associated with processing a circuit provisioning request from a network administrator or a user will in accordance with an embodiment of the present invention.

With reference to FIG. 10a, the general steps associated with processing a circuit provisioning request from a network administrator or a user will be described in accordance with an embodiment of the present invention. A process 500 of processing requests begins at step 502 in which a request to provision a circuit is received. Once the request to provision a circuit is received, a determination is made in step 506 regarding whether the requested circuit is an open ended UPSR/SNCP circuit. In determining whether the requested circuit is an open ended UPSR/SNCP circuit, a network administrator may determine whether to remove an initial overall source or a final overall destination that is of a different type than the rest of the nodes in a network from the overall requested circuit such that an open ended UPSR/SNCP circuit is effectively requested. That is, an original request for a close ended UPSR/SNCP circuit may be converted into a request for an open ended UPSR/SNCP circuit by effectively removing either an initial overall source or a final overall destination from the original request.

If it is determined that the requested circuit is not an open ended UPSR/SNCP circuit, then the indication is that the requested circuit may be substantially any other type of circuit. By way of example, the requested circuit may be a dual ring interconnect (DRI) or a low order aggregation point (LAP). Accordingly, process flow proceeds from step 506 to step 510 in the requested circuit is routed as appropriate, based on constraints associated with the requested circuit. When the requested circuit is either a DRI or a LAP, a DRI or an LAP, respectively, may computed, as appropriate using substantially any suitable method, as will be appreciated by those skilled in the art. Once the requested circuit is routed, the process of processing a circuit provisioning request is completed.

Alternatively, if it is determined in step 506 that the requested circuit is an open ended UPSR/SNCP circuit, then a determination is made in step 514 as to whether the requested circuit has two sources and one destination. If it is determined that the circuit has two sources and one destination, then a primary source is identified, and a protected path from the primary source to the destination is found in step 518. One method of finding a protected path from the primary source to the destination will be described below with respect to FIG. 10b. After a protected path from the primary source to the destination is identified, the processing of a circuit provisioning request is completed.

When it is determined in step 514 that the requested circuit does not have two sources and one destination, then the implication is that the requested circuit has one source and two destinations. Hence, in step 522, a protected path is obtained from the source to a primary destination. The steps associated with finding a protected path between the source and a primary destination will be described below with reference to FIG. 10*c*.

Figure 10B:
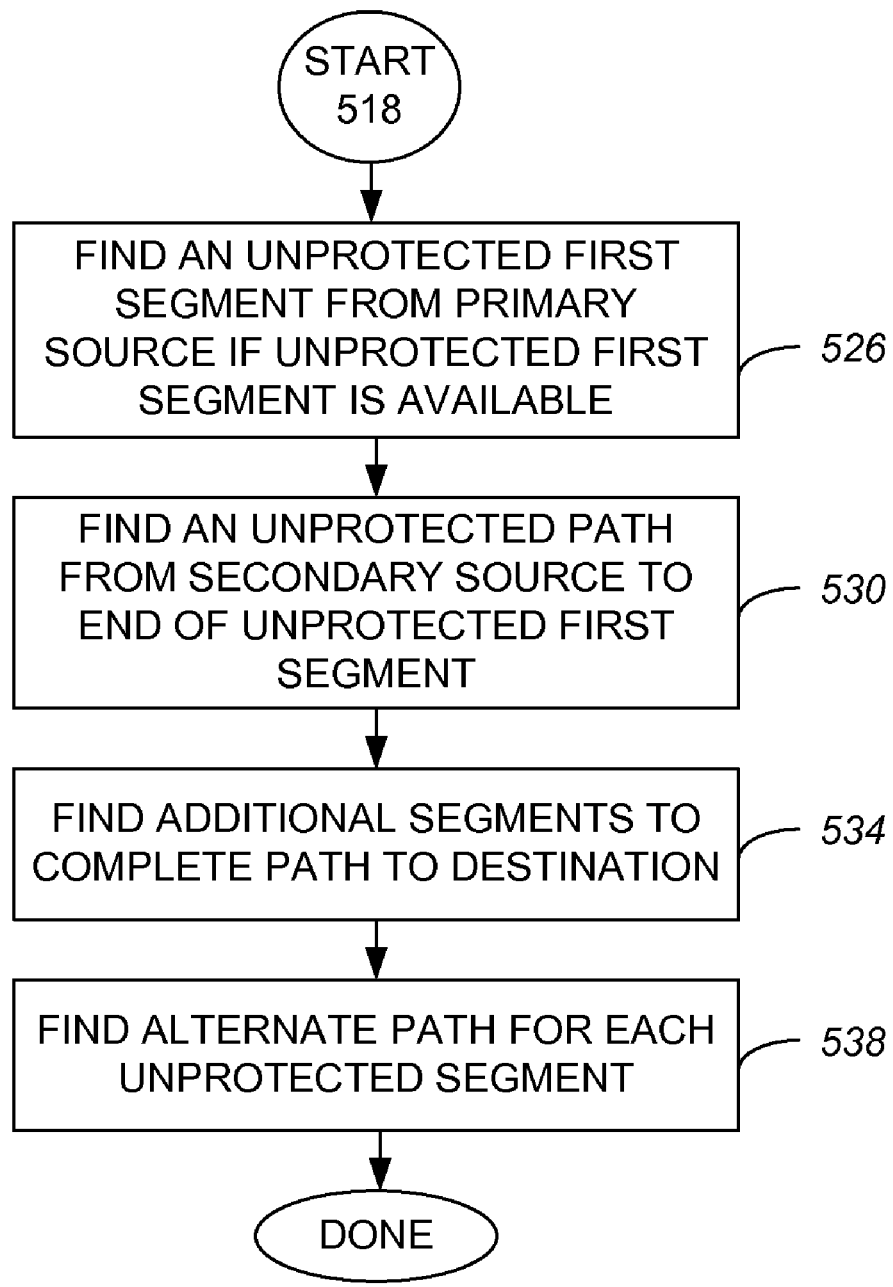
FIG. 10b is a process flow diagram which illustrates the steps associated with a method of finding a protected path from a primary source to a destination, i.e., step 518 of FIG. 10a, in accordance with an embodiment of the present invention.

When a requested circuit has two sources and one destination, a protected path is found between a first source, or the primary source, and the destination. FIG. 10*b* is a process flow diagram which illustrates the steps associated with a method of finding a protected path from a primary source to a destination, i.e., step 518 of FIG. 10*a*, in accordance with an embodiment of the present invention. A method 518 begins at step 526, an unprotected first segment associated with the primary source is found, if such a first segment exists. It should be appreciated that in the event that an unprotected first segment does not exist, but a segment with 1+1 protection is available, the segment with 1+1 protection may be found for use in a protected path between the primary source and the destination, due to the fact that the primary source may accept the same signal from an external source and from a secondary source.

When an unprotected first segment from the primary source to an intermediate node is found, then in step 530, an unprotected path from the secondary source to the end of the unprotected first segment is found. Once the unprotected path from the secondary source to the end of the unprotected first segment is found, additional segments are found in step 534 to complete the circuit path between the primary source and the destination. The additional segments are generally unprotected segments, although in some instances, the additional segments may include segments which have 1+1 protection. For each unprotected segment, an alternate path is found in step 538 such that an overall circuit path between the primary source and the destination is effectively protected. Once alternate paths for each unprotected segment are found, then the process of finding a protected path from the primary source to the destination is completed.

Figure 10C:
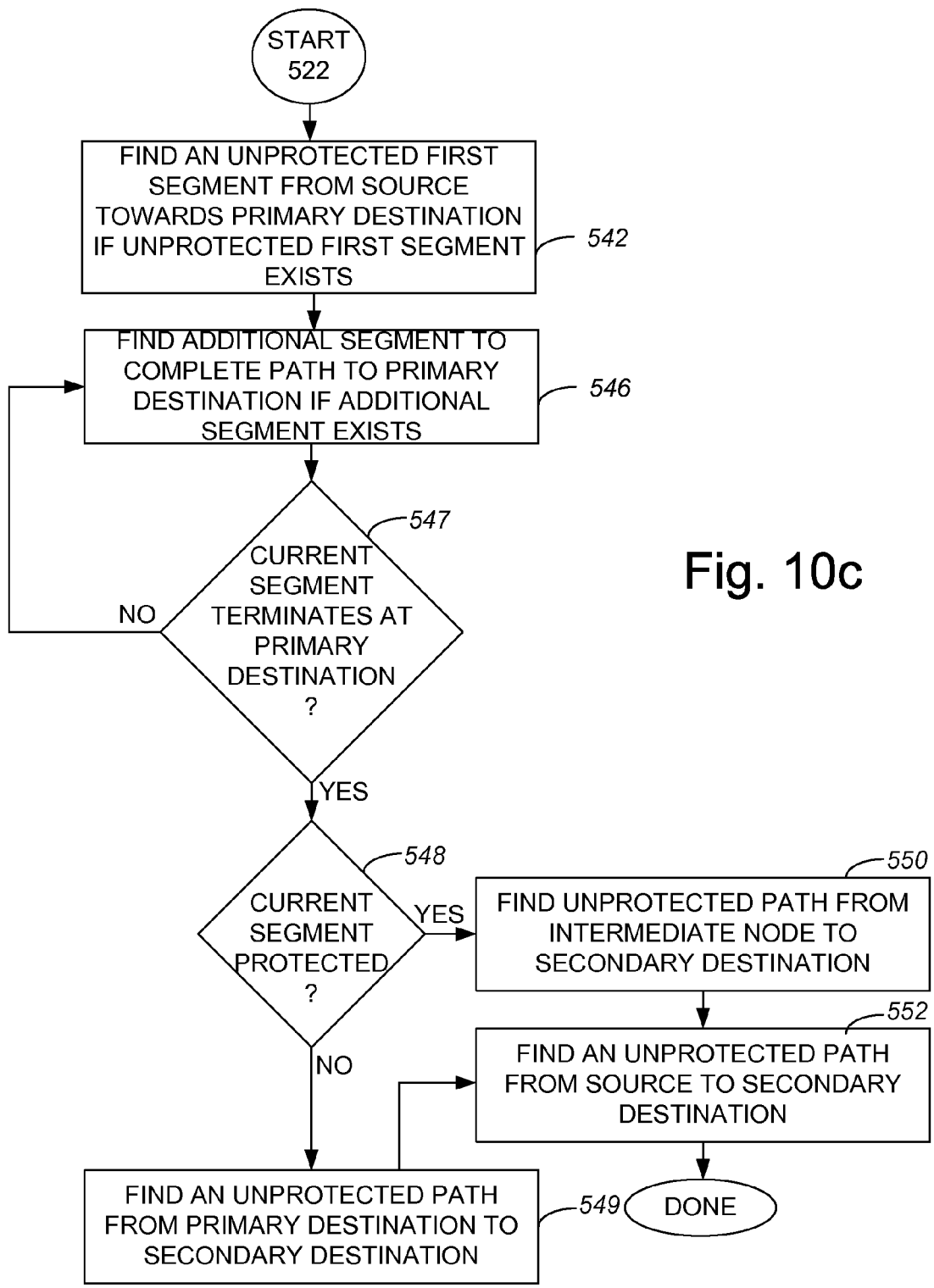
FIG. 10c is a process flow diagram which illustrates the steps associated with a method of finding a protected path from a source to a primary destination, i.e., step 522 of FIG. 10a, in accordance with an embodiment of the present invention.

FIG. 10*c* is a process flow diagram which illustrates the steps associated with a method of finding a protected path from a source to a primary destination, i.e., step 522 of FIG. 10*a*, in accordance with an embodiment of the present invention. A method 522 begins at step 542 in which an unprotected first segment from a source towards a primary destination is found in an unprotected first segment exists. It should be appreciated that when an unprotected first segment does not exist, a segment with line protection such as BLRS protection or 1+1 protection may be appropriate for use as a first segment. After a first segment is found, an additional segment is found in step 546 to complete an overall path to the primary destination, if such an additional segment is available. That is, the next segment in an overall path to the primary destination is found, if such a segment is available.

Once an additional segment is found, then a determination is made in step 547 regarding whether the current segment, i.e., the additional segment that was found, terminates at the primary destination. In other words, it is determined if the path between the source and the primary destination is completed. When it is determined that the current segment does not terminate at the primary destination, the process flow returns to step 546 in which an additional segment is found.

Alternatively, if it is determined in step 547 that the current segment does terminate at the primary destination, then it is determined in step 548 whether the current segment, which is initiated at an intermediate node, is protected. When it is determined that the current segment is not protected, then the indication is that the current segment is not a segment with line protection such as 1+1 protection. Accordingly, an unprotected path from the primary destination to a secondary destination is identified in step 549. Once an unprotected path from the primary destination to the secondary destination is identified, an unprotected path from the source to the secondary destination is found in step 552. After the unprotected path from the source to the secondary destination is found, the process of finding a protected path from the source to the primary destination is completed.

Returning to step 548, if it is determined that the current segment is protected, then process flow moves to step 550 in which an unprotected path from the intermediate node, i.e., the node at which the current segment originates, to the secondary destination is found. Upon finding an unprotected path between the intermediate node and the secondary destination, an unprotected path from the source to the secondary destination is identified in step 552.

Figure 11A:
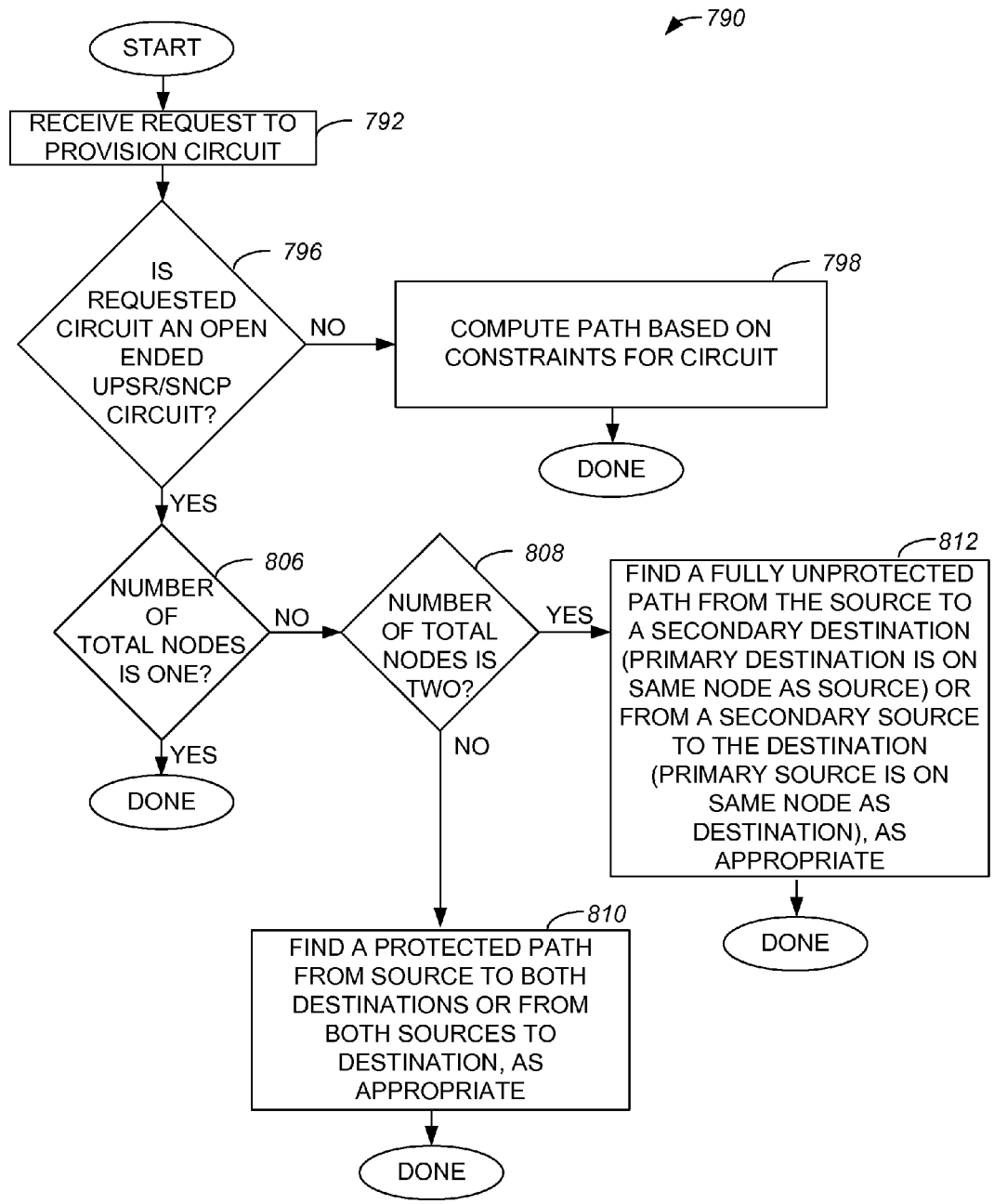
FIGS. 11a is a process flow diagram which illustrates the steps associated with a particular method of processing a request to provision a circuit within a network in accordance with an embodiment of the present invention.

In general, with respect to FIGS. 10*a-c*, the overall steps associated with responding to a request to provision an open ended UPSR/SNCP circuit have been described. It should be appreciated that the specific methods that may be used in the implementation of each overall step may vary widely. With reference to FIGS. 11*a-h*, one specific process of addressing a request to provision a circuit will be described in accordance with an embodiment of the present invention. With reference to FIG. 11*a*, a method of processing a request to provision a circuit will be described in accordance with an embodiment of the present invention. A method 790 of processing a request to provision a circuit begins at step 792 in which a request to provision a circuit is received, e.g., received on a node or a network element from a network administrator. Once the request to provision a circuit is received, it is determined in step 796 whether the requested circuit is an open ended UPSR/SNCP circuit. When it is determined that the requested circuit is not an open ended UPSR/SNCP circuit, the requested path is computed in step 798 using substantially any suitable method. The requested path may be, for example, a DRI circuit or an LAP circuit. After a requested circuit is computed, then the process of processing a circuit provisioning request is completed.

Alternatively, if it is determined in step 796 that the requested circuit is an open ended UPSR/SNCP circuit, then a determination is made in step 806 as to whether the number of total nodes associated with the request is one. When the number of total nodes is one, i.e., when a single source and two destinations are on the same node or a single destination and two sources are on the same node, then no routing is required with regards to provisioning a circuit. Hence, if it is determined that the number of total nodes is one, the process of processing a circuit provisioning request is completed.

If the determination in step 806 is that the total number of nodes associated with the source or sources and the destination or destinations is not one, then in step 808, it is determined if the number of total nodes is two. When the number of total nodes is determined to be two, then a fully unprotected path from a single source to a secondary destination, or a fully unprotected path from a secondary source to a single destination is found in step 812, as appropriate. If the total number of nodes is two, the indication is that either a primary destination is on the same node as the source, or a primary source is on the same node as the destination. In general, substantially any suitable method of finding a fully unprotected path may be used. Once a fully unprotected path is found, the process of processing a circuit provisioning request is completed.

However, if it is determined in step 808 that the total number of nodes is not two, then the indication is that there are three nodes associated either with the source and the two destinations or with the two sources and the destination. Accordingly, in step 810, a protected path from a source to both a primary destination and a secondary destination or a protected path from both a primary source and a secondary source to a destination is found, as appropriate. The steps associated with finding an appropriate protected path will be described below with respect to FIG. 11b. Once the protected path from the source to both destinations is found, the process of processing a circuit provisioning request is completed.

Figure 11B:
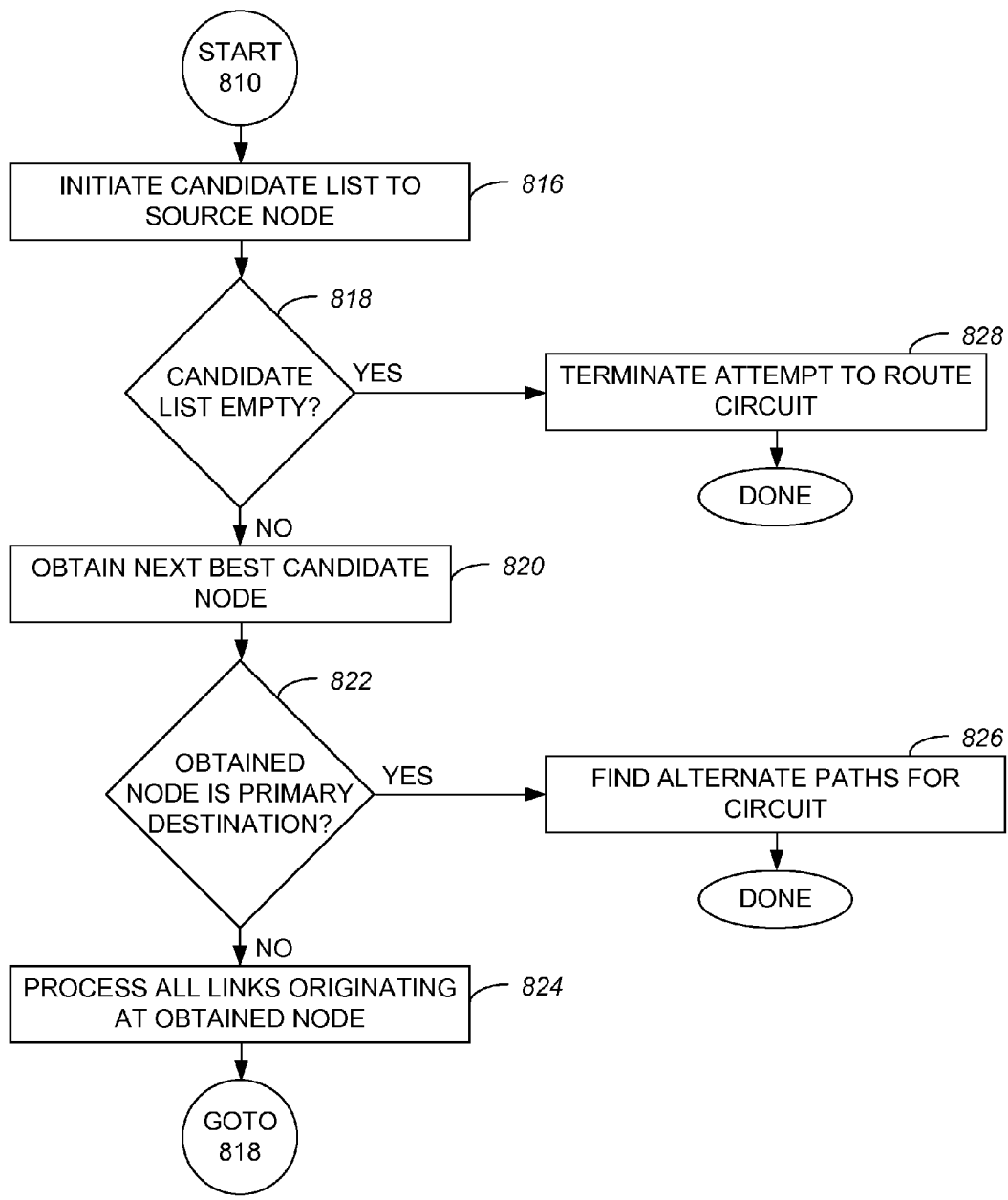
FIG. 11b is a process flow diagram which illustrates the steps associated with one method for finding a protected path, i.e., step 810 of FIG. 11a, in accordance with an embodiment of the present invention.

With reference to FIG. 11b, the steps associated with identifying a protected path, i.e., step 810 of FIG. 11a, will be described in accordance with an embodiment of the present invention. A process 810 of finding a protected path begins at step 816 in which a candidate list to a source node is initiated. When the candidate list is initiated to the source node, the candidate list generally includes a list of candidate nodes at which a first link or segment of a path between a source and a destination may terminate.

It is determined in step 818 as to whether the candidate list is empty. If it is determined that the candidate list is empty, then the attempt to route a circuit is terminated in step 828, and the process of finding a protected path is effectively aborted. Alternatively, if it is determined in step 818 that the candidate list is not empty, then the best candidate node in the candidate list is obtained in step 820. It is determined in step 822, after the best candidate node is obtained, whether the obtained node is a destination of the requested circuit. That is, it is determined if the obtained node is a primary destination of a requested circuit with two destinations or if the obtained node is the sole destination of a requested circuit with two sources. If it is determined that the obtained node is not a destination, then the indication is that the obtained node is an intermediate node. As such, in step 824, substantially all links which originate at the obtained node are processed, in order to create a path between the source node and the primary destination. The steps associated with one method of processing links which originate at the obtained node will be discussed below with respect to FIG. 11c. After the links are processed in step 824, process flow returns to step 818 and the determination of whether a candidate list, i.e., a candidate list associated with the obtained node, is empty.

Returning to step 822, if it is determined that the obtained node is either a sole destination or a primary destination, then the circuit path between a source node and the destination is completed. Hence, in order to protect the circuit path between the source node and the primary node, an alternate circuit path which is arranged to protect the path between the source node and the primary destination is found in step 826. Finding an alternate circuit path generally involves finding unprotected segments in the circuit path and finding corresponding alternate segments for those unprotected segments. It should be appreciated that identifying alternate circuit paths may involve creating pseudo links between either two destinations or two sources, as appropriate. When a routing module effectively considers the pseudo link to be an actual link, then the pseudo link may be used to allow a overall path which originates at the source node and ends at the secondary destination to protect an overall path which originates at the source node and ends at the primary destination, since the pseudo link provides a virtual connection between the secondary destination and the primary destination, for example. The use of a pseudo link generally enables a primary path to be validated. Once an alternate circuit path is found, the process of finding a protected path is completed.

Figure 11C:
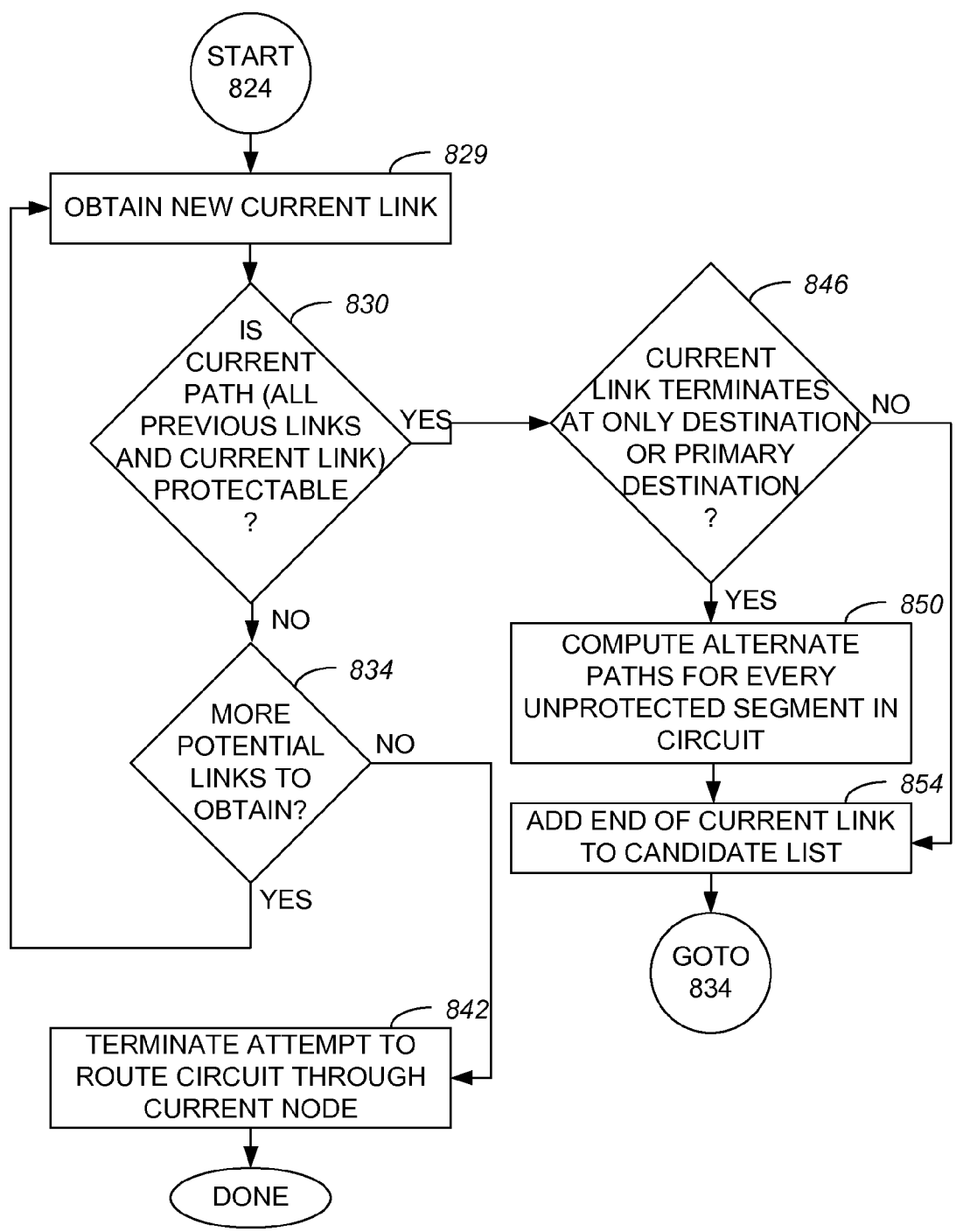
FIG. 11c is a process flow diagram which illustrates the steps associated with one method for processing all links originating at an obtained node, i.e., step 824 of FIG. 11b, in accordance with an embodiment of the present invention.

FIG. 11c is a process flow diagram which illustrates the steps associated with one method for processing substantially all links originating at an obtained node, i.e., step 824 of FIG. 11b, in accordance with an embodiment of the present invention. The processing of the links which originate at the obtained node begins at step 829 in which a current link is obtained. Then, in step 830, it is determined if the current path is protectable. It should be appreciated that the current path includes substantially all segments between a source and the obtained node, as well as a current link which is being processed. The current link generally originates at the obtained node. The steps associated with determining whether the current path is protectable will be described below with respect to FIGS. 11d-f. If it is determined that the current path is protectable, then it is determined in step 846 if the current link, i.e., the current link which originates at the obtained node, terminates at either the only destination or the primary destination.

When it is determined that the current link terminates at either the only destination or the primary destination, the indication is that the circuit between a source and a destination is completed. Hence, in step 850, alternate path segments for substantially every unprotected segment in the current path or circuit is computed. The computation of alternate path segments generally uses many of the same steps as used in determining if the current path is protectable, i.e., step 830, and the alternate path segments are computed for each unprotected segment identified within the current path.

Once alternate paths are computed, the end of the current link is added to the candidate list in step 854, and process flow moves to step 834 in which it is determined if there are more potential links to obtain. On the other hand, if it is determined in step 846 that the current link does not terminate at either the only destination or the primary destination, process flow moves directly from step 846 to step 854 in which the end of the current link is added to the candidate list.

Referring back to step 830, if the determination is that the current path is not protectable, it is determined in step 834 whether there are more potential links, i.e., more potential links which originate at the obtained node, to be obtained. If there are more potential links to obtain, then process flow returns to step 829 in which a new current link is obtained. Alternatively, if it is determined that there are no more potential links to obtain, then the attempt to route the circuit through the current, or obtained, node is terminated in step 842.

Figure 11D:
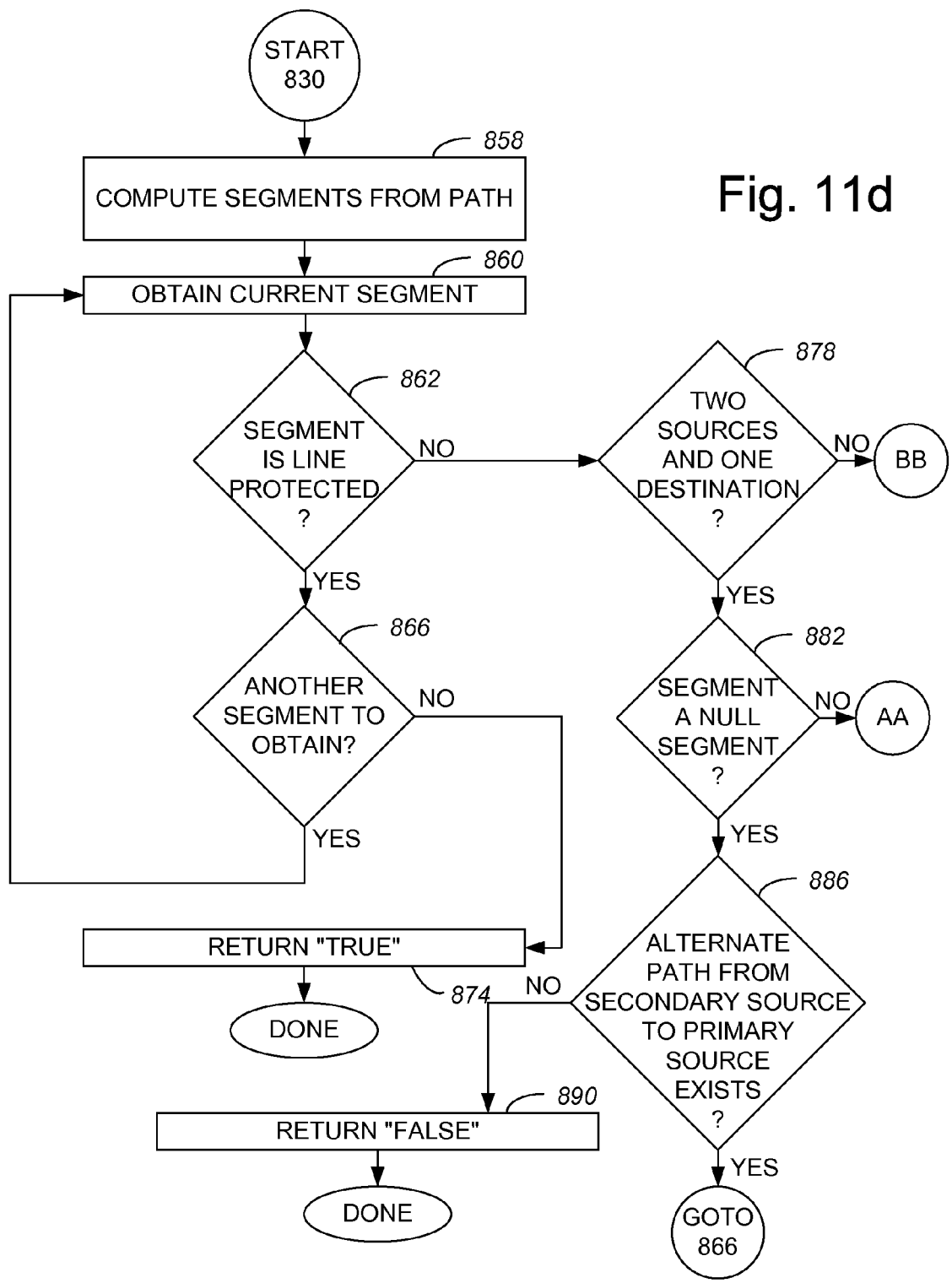
FIGS. 11d-f are a process flow diagram which illustrates the steps associated with one method for determining whether a current path is protectable, i.e., step 830 of FIG. 11c, in accordance with an embodiment of the present invention.
Figure 11E:
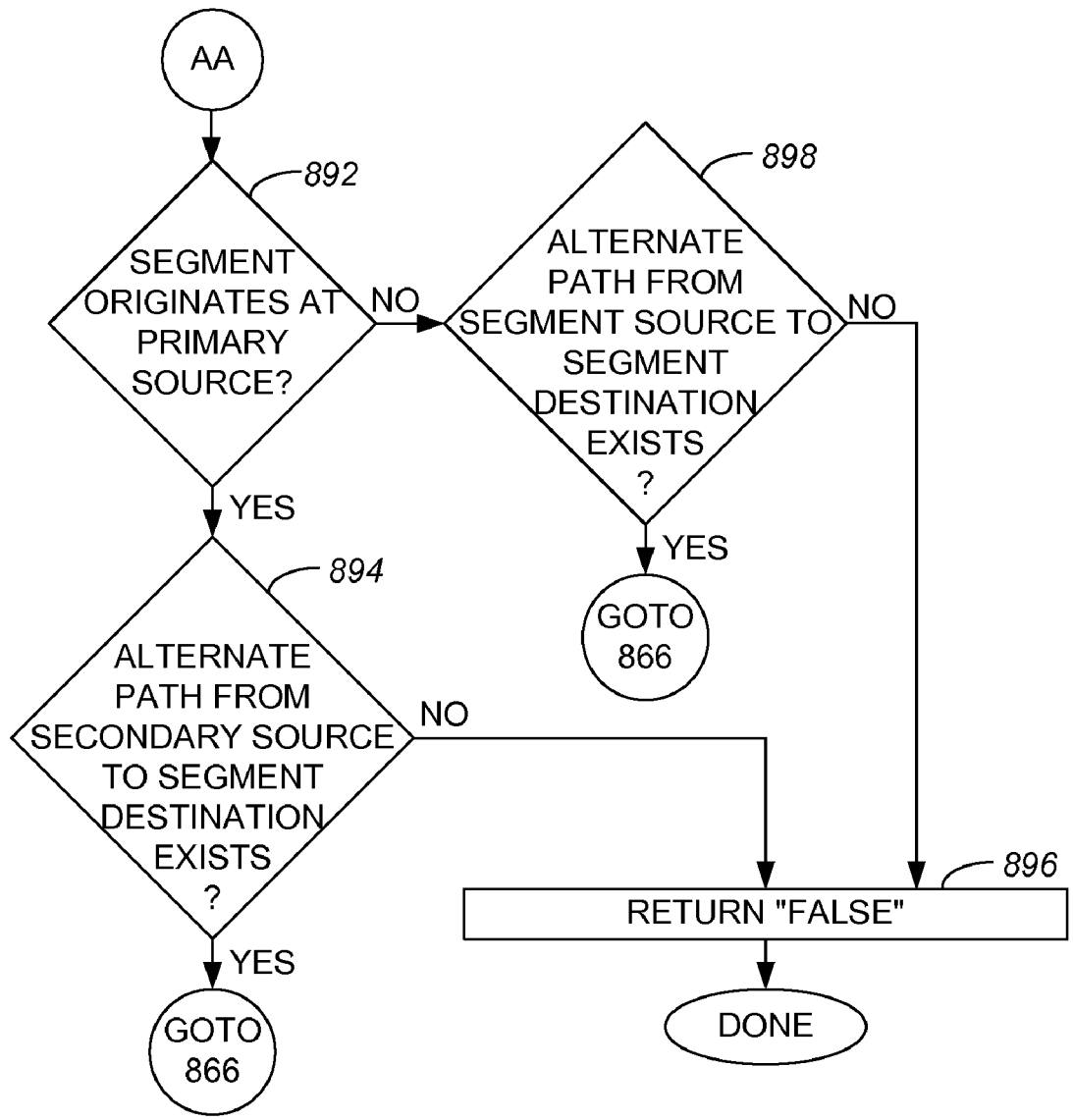
Figure 11F:
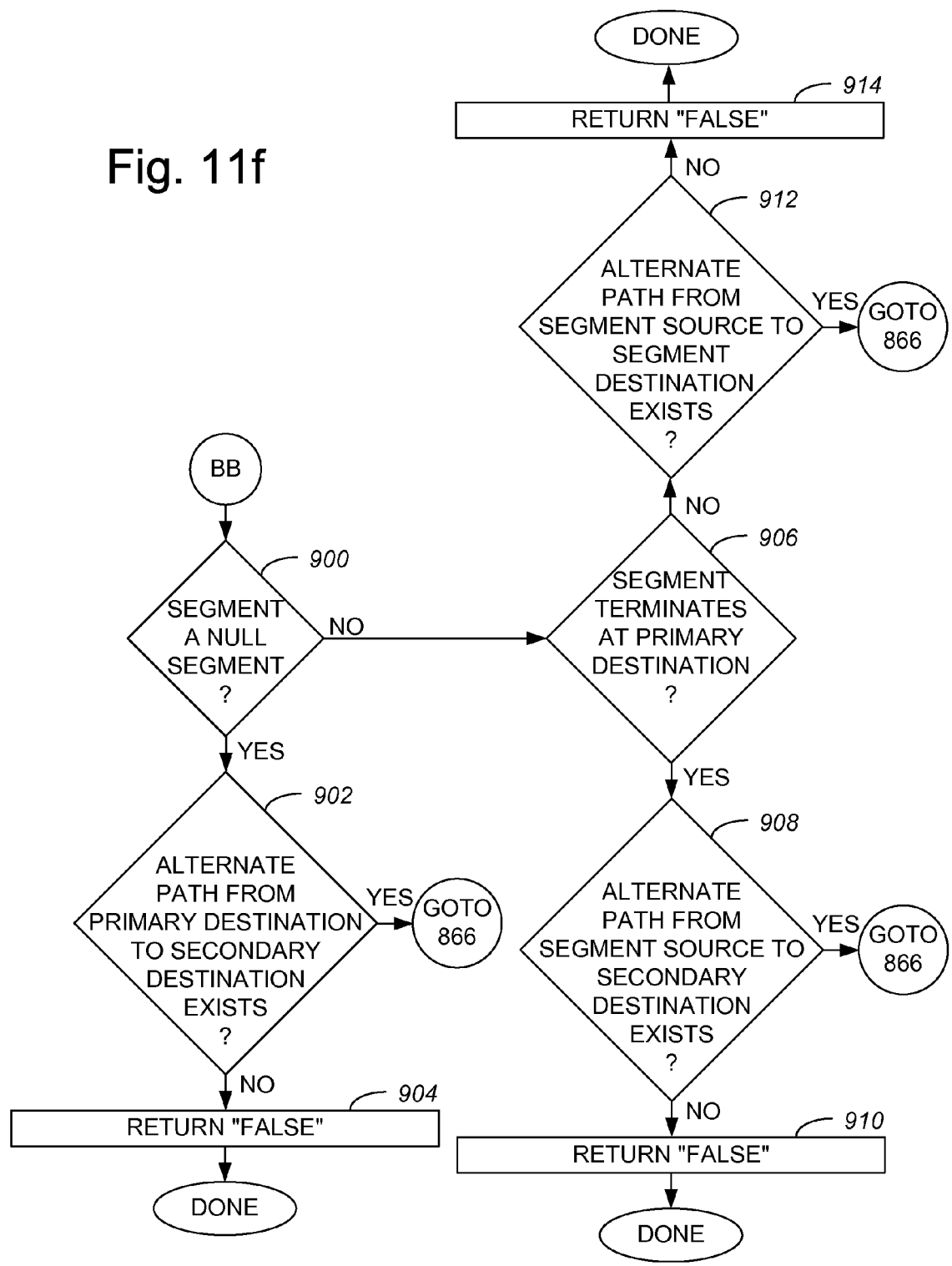

With reference to FIG. 11d, the steps associated with one method of determining whether a current path is protectable, i.e., step 830 of FIG. 11c, will be described in accordance with an embodiment of the present invention. A method of determining whether a current path is protectable begins at step 858 in which segments from the current path are computed. Computing segments may include identifying separate links or groups of links which are substantially adjacent to one another and have the same type of protection. For example, if two adjacent links in the current path have 1+1 protection, those two links may form a segment. One suitable method of computing segments will be discussed below with respect to FIGS. 11g and 11h.

After segments are computed, a current segment is identified in step 860. Then, it is determined in step 862 whether the segment, i.e., the current segment, is line protected. If it is determined that the current segment is line protected, then process flow proceeds to step 866 in which it is determined if there is another segment to obtain. When it is determined that there is another segment to obtain, process flow returns to step 860 in which a new current segment is obtained. Alternatively, if it is determined that there is not another segment to be obtained in step 866, then the indication is that all segments have been processed, and that the current path is protectable.

As such, a value of "true" is returned in step 874, and the process of determining whether a current path is protectable is completed.

Returning to step 862, when it is determined that the current segment is not line protected, it is then determined in step 878 whether the requested circuit path has two sources and one destination. When it is determined that the requested circuit path has two sources and one destination, then it is determined in step 882 whether the current segment is a null segment. If it is determined in step 882 that the current segment is a null segment, then process flow moves to step 886 in which it is determined whether an alternate path from the secondary source to the primary source exists.

When the determination in step 886 is that an alternate path from the secondary source to the primary source does not exist, then a value of "false" is returned in step 890 to indicate that the current path is not protectable. Once the value of "false" is returned, the process of determining whether the current path is protectable is completed. If, on the other hand, it is determined in step 866 that an alternate path from the secondary source to the primary source does exists, then process flow returns to step 866 in which it is determined if there is another segment to obtain.

Referring back to step 882, if it is determined that the current segment is not a null segment, a determination is made in step 892 regarding whether the current segment originates at the primary source. When the current segment originates at the primary source, then the indication is that the current segment is the first segment in the current path. Accordingly, in step 894, it is determined whether an alternate path from the secondary source to the segment destination exists. If such an alternate path does not exist, a value of "false" is returned in step 896 to indicate that the current path is not protectable, and the process of determining whether the current path is protectable is completed. Alternatively, if it is determined that such an alternate path is in existence, then process flow returns to step 866 and the determination of whether there is another segment to obtain.

Returning to step 892, when it is determined that the current segment does not originate at the primary source, then it is determined in step 898 whether there is an alternate path between the segment source and the segment destination. The determination of such an alternate path typically involves the use of a pseudo link. That is, before computing such an alternate path, a pseudo link is created between the primary source and the secondary source, since it may otherwise not be possible to create an alternate path between the segment source and the segment destination. If such an alternate path does not exist, a value of "false" is returned in step 896 to indicate that the current path is not protectable, and the process of determining whether the current path is protectable is completed. Alternatively, if it is determined that such an alternate path does exist, then process flow returns to step 866 and the determination of whether there is another segment to obtain.

With reference back to step 878 and the determination of whether the requested circuit path has two sources and a single destination, if it is determine that the requested circuit path does not have two sources and a single destination, then the indication is that the requested circuit path has a single source and two destinations. As such, from step 878, process flow moves to step 900 in which it is determined if the current segment is a null segment. If it is determined that the current segment is a null segment, a determination is made in step 902 regarding whether there is an alternate path from the primary destination to the secondary destination. If it is determined that an alternate path from the primary destination to the secondary destination does not exist, then a value of "false" is returned in step 904 which indicates that the current path is not protectable. Once the value of "false" is returned, the process of determining whether the current path is protectable is completed. Alternatively, if it is determined in step 902 that an alternate path from the primary destination to the secondary destination does exist, then process flow returns to step 866 in which it is determined whether there in another segment in the current path to obtain.

When the determination in step 900 is that the segment is not a null segment, a determination is made as to whether the current segments terminates at the primary destination in step 906. If the current segment is determined to terminate at the primary destination, it is determined in step 908 whether there is an alternate path from the segment source to the secondary destination. If such an alternate path is determined not exist, a value of "false" is returned in step 910 to indicate that the current path is not protectable, and the process of determining whether the current path is protectable is completed. Alternatively, if it is determined that such an alternate path does exist, then process flow returns to step 866 and the determination of whether there is another segment to obtain.

In step 906, if the determination is that the current segment does not terminate at the primary destination, a determination is made in step 912 whether an alternate path from the segment source to the segment destination exists. In order to determine whether an alternate path from the segment source to the segment destination exists, a pseudo link is generally created between the primary destination and the secondary destination prior to attempting to identify an alternate path. When an alternate path between the segment source and the segment destination is determined not to exist, a value of "false" is returned in step 912 to indicate that the current path is not protectable, and the process of determining whether the current path is protectable is completed. On the other hand, if it is determined in step 912 that such an alternate path does exist, then process flow returns to step 866 and the determination of whether there is another segment to obtain.

Figure 11G:
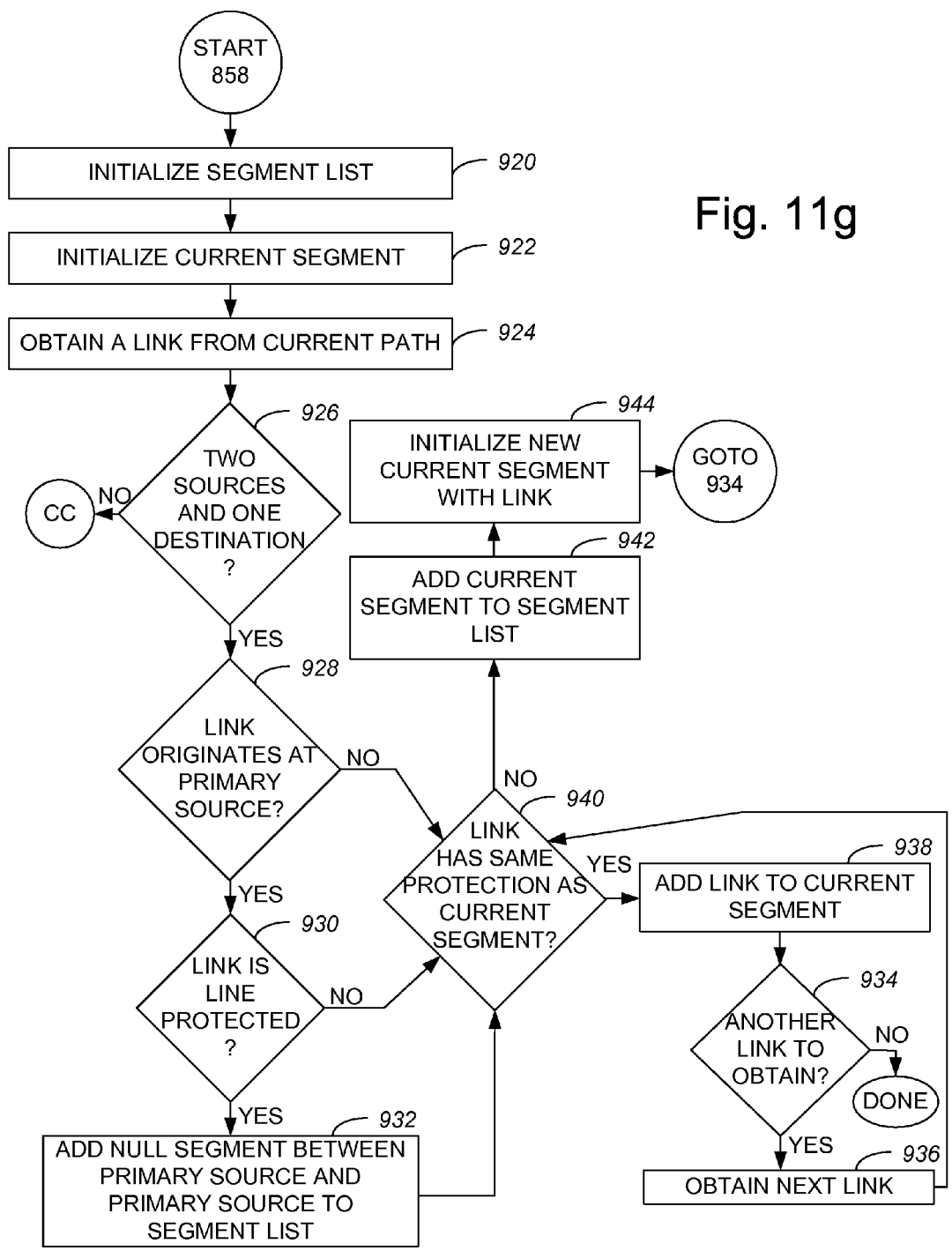
FIGS. 11g and 11h are a process flow diagram which illustrates the steps associated with one method of computing segments, i.e., step 858 of FIG. 11d, in accordance with an embodiment of the present invention.
Figure 11H:
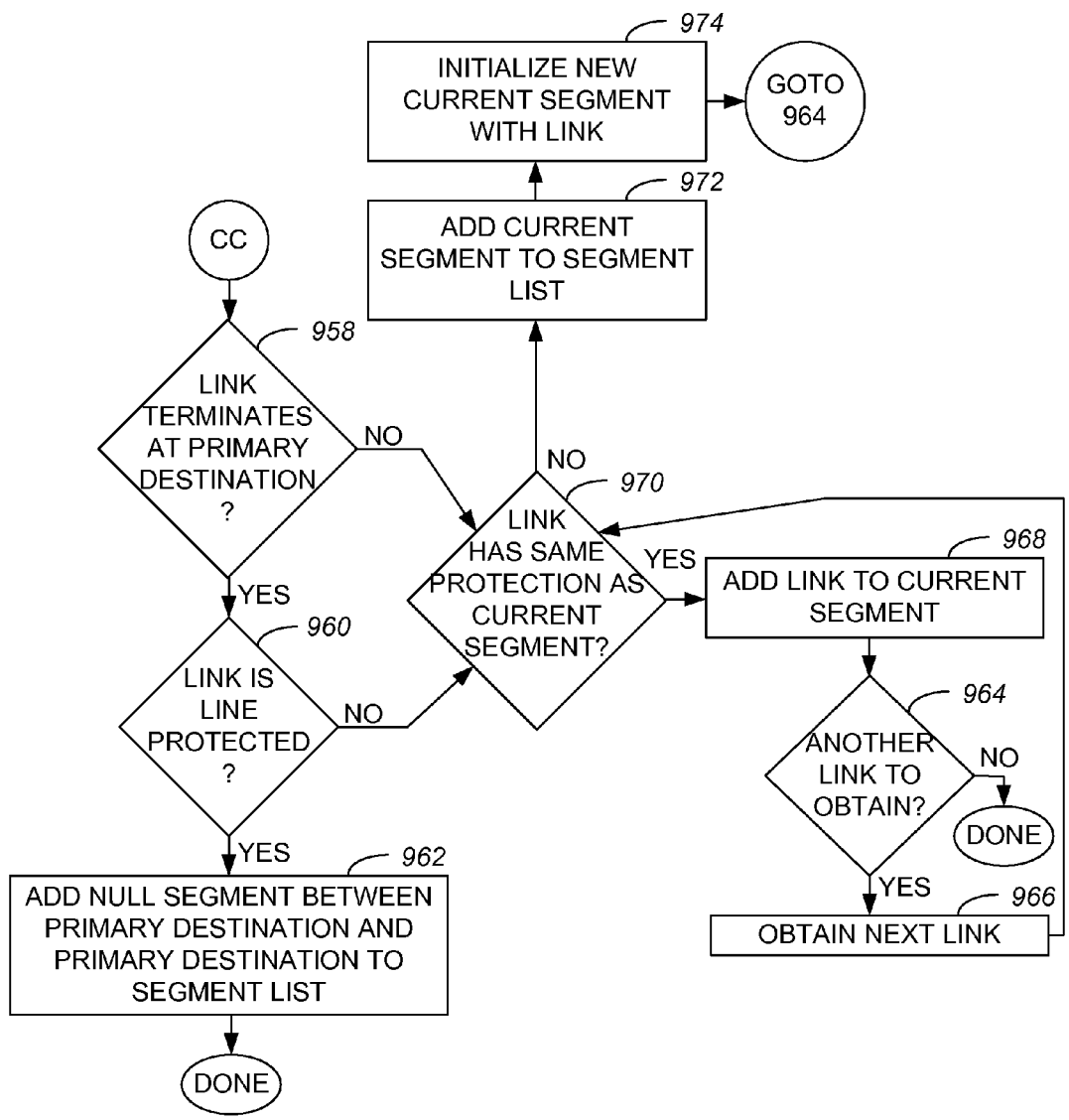

FIGS. 11g and 11h are a process flow diagram which illustrates the steps associated with one method of computing segments, i.e., step 858 of FIG. 11d, in accordance with an embodiment of the present invention. A process of computing segments in a current path begins at step 920 in which a segment list is initialized. Once the segment list is initialized, a current segment is initialized in step 922. After the current segment is initialized, a current link is obtained from the current path in step 924.

A determination is made in step 926 regarding whether the requested circuit path has two sources and a single destination. If it is determined that the requested circuit path has two sources and a single destination, it is then determined in step 928 whether the current link originates at the primary source. If it is determined that the current link originates at the primary source, then a determination is made in step 930 as to whether the current link is line protected.

If the current link is determined to be line protected, then a null segment is added between the primary source and the primary source in the segment list in step 932. Once the null segment is added, it is determined in step 940 whether the current link has the same protection as the current segment. In other words, it is determined in step 940 whether the current link belongs in the current segment.

If the determination in step 940 is that the current link has the same protection as the current segment, then the current link is added to the current segment in step 938. Once the current link is added to the current segment, process flow returns to step 934 and the determination of whether there is another link to obtain. Alternatively, if the determination in step 940 is that the current link has a different type of protection that the current segment, the current segment is added to the segment list in step 942. Then, in step 944, a new current segment is initialized with the current link. After the new current segment is initialized, process flow moves to step 934 and the determination of whether there is another link to obtain.

When there is not another link to obtain in step 934, then substantially all segments in the current path have been computed, and the process of computing segments is completed. Alternatively, if there is another link to obtain, then the indication is that there are more links in the current path that are to be processed. Accordingly, in step 936, the next link in the current path is obtained. After the next link is obtained, that link effectively becomes the current link. Process flow moves from step 936 to step 940 in which it is determined whether the current link has the same protection as the current segment.

Returning to step 930, if it is determined that the current link is not line protected, then process flow proceeds to step 940 and the determination of whether the current link has the same protection as the current segment. Similarly, if it is determined in step 928 that the current link does not originate at the primary source, process flow also proceeds to step 940.

Referring back to step 926, if it is determined that the requested circuit path does not have two sources and one destination, then the indication is that the requested circuit path has one source and two destinations. Accordingly, in step 958, it is determined whether the current link terminates at the primary destination. If it is determined that the current link terminates at the primary destination, then a determination is made in step 960 as to whether the current link is line protected.

When the current link is determined to be line protected in step 960, then a null segment is added between the primary destination and the primary destination in the segment list in step 962. Once the null segment is added, the process of computing segments is completed. Returning to step 960, if it is determined that the current link is not line protected, then process flow proceeds to step 970 in which a determination is made regarding whether the current link has the same protection as the current segment. Similarly, if it is determined in step 958 that the current link does not originate at the primary source, process flow also proceeds to step 970.

If the determination in step 970 is that the current link has the same protection as the current segment, then the current link is added to the current segment in step 968. Once the current link is added to the current segment, process flow returns to step 964 and the determination of whether there is another link to obtain. Alternatively, if the determination in step 970 is that the current link has a different type of protection that the current segment, the current segment is added to the segment list in step 972. A new current segment is then initialized using the current link in step 974.

After the new current segment is initialized in step 974, it is determined in step 964 whether there is another link to obtain for processing. When there is not another link to obtain, then substantially all segments in the current path have been computed, and the process of computing segments is completed. Alternatively, when it is determined that there is another link to obtain, then the indication is that there are more links in the current path that are to be processed. Hence, in step 966, the next link in the current path is obtained. After the next link is obtained, that link effectively becomes the current link. Process flow moves from step 966 to step 970 in which it is determined whether the current link has the same protection as the current segment.

Although only a few embodiments of the present invention have been described, it should be understood that the present invention may be embodied in many other specific forms without departing from the spirit or the scope of the present invention. By way of example, although a circuit provisioning request has been described as specifying whether a requested circuit has two source nodes or two destination nodes, the circuit provisioning request may instead include a single source node and a single destination. When the single source node is of a different type than other relevant nodes in a network, the single source node may effectively be removed from consideration and replaced with two alternate source nodes which are of the same type as substantially all other relevant nodes in the network and are linked to the single source node. Once paths from the two alternate source nodes to the destination are found, the single original source node may be linked back to the two alternate source nodes.

Similarly, when a circuit provisioning request involves a single source node and a single destination node where the single destination node is of a different type than all other relevant nodes in a network, the single destination node may effectively be removed from consideration in a routing process. Hence, two alternate destination nodes which are coupled by a pseudo link may be used in the routing process, as discussed previously. Once appropriate paths are routed, the overall destination node may effectively be linked to the two alternate destination nodes.

An open-ended circuit has generally been described as either being a UPSR circuit or a SNCP circuit. It should be understood that an open-ended circuit is not limited to either being a UPSR circuit or a SNCP circuit. Additionally, networks within which open-ended circuits may be provisioned are not limited to being optical networks.

In general, steps associated with the various methods of the present invention may be altered, reordered, added, and removed without departing from the spirit or the scope of the present invention. By way of example, after a path between a source and a primary destination is divided into segments and a segment list is initialized, it should be appreciated that each time a segment from the segment list is processed, that segment may be removed from the segment list. Alternatively, in one embodiment, determining whether a segment list is empty, as for example in step 652 of FIG. 11e, may effectively entail determining whether there are any segments remaining in the segment list which have not yet been processed.

When various steps associated with the methods of the present invention are unsuccessfully executed, the steps may effectively be aborted. For instance, in finding an alternate path for a circuit, when an alternate path may not be found, e.g., because an unprotected path for a particular segment may not be found, the overall processing of a circuit provisioning request may terminate unsuccessfully. More generally, the overall processing of a circuit provisioning request may terminate unsuccessfully at any time when any step associated with the processing of the request may not be successfully completed. Therefore, the present examples are to be considered as illustrative and not restrictive, and the invention is not to be limited to the details given herein, but may be modified within the scope of the appended claims.

What is claimed is:

1. A method comprising:
   receiving at a network administration user interface unit a request to route an open-ended circuit, the request being arranged to specify a first network element, a second network element, and a third network element, wherein the second network element and the third network element are configured to be linked to a destination network element;

at a computing device in a network element coupled to the network administration user interface unit:

computing for the open-ended circuit a primary unidirectional path from the first network element to the second network element;

creating a representation of a link between the third network element and the second network element that is configured to allow an alternate unidirectional path from the first network element that passes through the third network element to the second network element to be identified such that the destination network element is removed and not considered as part of the alternate unidirectional path when the destination network element is of a different type than the first, second and third network elements;

computing for the open-ended circuit a portion of the alternate unidirectional path from the first network element to the third network element based on the identified path.

2. The method of claim 1, wherein receiving the request comprises receiving the request specifying that the first network element is a source, the second network element is a primary destination, and the third network element is a secondary destination, and wherein computing comprises computing, on the basis of the primary unidirectional path and the alternate unidirectional path, a protected path in the open-ended circuit such that the primary destination and the secondary destination replace the destination network element when the destination network element is associated with a different vendor or service provider than the first, second, and third network elements.

3. The method of claim 1, and further comprising linking the second network element and the third network element to the destination network element, wherein computing comprises computing a path between the first network element and the destination network element via the second network element for use as part of the primary path and computing a path between the first network element and the destination network element via the third network element for use as part of the alternate path, and wherein the first, second, third and destination network elements are part of a unidirectional path protected switched ring (UPSR) or an open-ended sub-network connection protection (SNCP) circuit.

4. The method of claim 3, wherein the destination network element is associated with a different vendor or service provider and the first, second, and third network elements are associated with the same vendor or service provider, and computing comprises computing a protected path on the basis that the destination network element is deemed inaccessible or unavailable to path routing for the protected path and a link between two of the first, second, and third network elements is computed to serve as a replacement for the destination network element within the UPSR or the SNCP circuit.

5. The method of claim 1, wherein receiving comprises determining when the request specifies a route for the open-ended circuit comprising a source, a primary destination and a secondary destination among the first, second and third network elements, and wherein computing comprises determining a protected path from the source to the primary destination comprising:

determining an unprotected first segment from the source to the primary destination if it exists;

determining an additional segment to complete an overall path to the primary destination if an additional segment is available;

repeating determining an additional segment until a current segment terminates at the primary destination;

determining whether the current segment that terminates at the primary destination is from an intermediate node that is protected;

when it is determined that the current segment is not protected, determining an unprotected path from the primary destination to the secondary destination and determining an unprotected path from the source to the secondary destination; and when it is determined that the current segment is protected, determining an unprotected path from an intermediate node at which the current segment originates to the secondary destination.

6. The method of claim 1, further comprising creating a bidirectional link between the second network element and the third network to replace the representation of the link and that is configured to provide a path from the first network element to the second network element via the third network element and a path from the first network element to the third network element via the second network element such that the primary unidirectional path and alternate unidirectional path may be automatically provisioned without manual provisioning via the network administration user interface unit.

7. A system comprising:

a network administration user interface unit configured to receive a request to route an open-ended circuit, the request specifying a first network element, a second network element, and a third network element, wherein the second network element and the third network element are configured to be linked to a destination network element; and a network element configured to be coupled to the network administration user interface unit, wherein the network element comprises a computing device configured to:

compute for the open-ended circuit a primary path from the first network element to the second network element;

create a representation of a link between the third network element and the second network element that is configured to allow an alternate unidirectional path from the first network element that passes through the third network element to the second network element to be identified such that the destination network element is removed and not considered as part of the alternate unidirectional path when the destination network element is of a different type than the first, second and third network elements;

compute for the open-ended circuit a portion of the alternate unidirectional path from the first network element to the third network element based on the identified path.

8. The system of claim 7, wherein the network administration user interface unit is configured to receive the request that specifies that the first network element is a source, the second network element is a primary destination and the third network element is a secondary destination, and wherein the computing device is configured to compute, on the basis of the primary path and the alternate path, a protected path in the open-ended circuit such that the primary destination and the secondary destination replace the destination network element when destination network element is associated with a different vendor or service provider than the first, second, and third network elements.

9. The system of claim 7, wherein the computing device is further configured to:
- link the second network element and the third network element to the destination network element;
- compute a path between the first network element and the destination network element via the second network element for use as part of the primary path; and
- compute a path between the first network element and the destination network element via the third network element for use as part of the alternate path, and wherein the first, second, third and fourth network elements are part of a unidirectional path protected switched ring (UPSR) or an open-ended sub-network connection protection (SNCP) circuit.

10. The system of claim 9, wherein the computing device is configured to compute the primary and alternate paths on the basis that the destination network element is associated with a different vendor or service provider and the first, second, and third network elements are associated with the same vendor or service provider, and the computing device is configured to compute a protected path on the basis that the destination network element is deemed inaccessible or unavailable to path routing for the protected path and a link between two of the first, second, and third network elements is computed to serve as a replacement for the destination network element within the UPSR or the SNCP circuit.

11. The system of claim 7, wherein the network administration user interface unit is configured to receive the request which specifies the open-ended circuit comprising a source, a primary destination and a secondary destination among the first, second and third network elements, and wherein the computing device is configured to determine a protected path from the source to the primary destination by being configured to:
- determine an unprotected first segment from the source to the primary destination if it exists;
- determine an additional segment to complete an overall path to the primary destination if an additional segment is available;
- repeat determining an additional segment until a current segment terminates at the primary destination;
- determine whether the current segment that terminates at the primary destination is from an intermediate node that is protected;
- when it is determined that the current segment is not protected, determine an unprotected path from the primary destination to the secondary destination and determine an unprotected path from the source to the secondary destination; and
- when it is determined that the current segment is protected, determine an unprotected path from an intermediate node at which the current segment originates to the secondary destination.

12. A method comprising:
- receiving at a network administration user interface unit a request to route an open-ended circuit, the request being arranged to specify a first network element, a second network element, and a third network element, wherein the second network element and the third network element are configured to be linked to a source network element;
- at a computing device in a network element coupled to the network administration user interface unit:
  - computing for the open-ended circuit a primary unidirectional path from the second network element to the first network element;
  - creating a representation of a link between the second network element and the third network element that is configured to allow an alternate unidirectional path from the third network element to the first network element to be identified such that the source network element is removed and not considered as part of the alternate unidirectional path when the source network element is of a different type than the first, second and third network elements; and
  - computing for the open-ended circuit a portion of the alternate unidirectional path from the third network element to the first network element based on the identified path.

13. The method of claim 12, wherein receiving the request comprises receiving the request specifying that the first network element is a destination, the second network element is a primary source, and the third network element is a secondary source, and wherein computing comprises computing, on the basis of the primary unidirectional path and the alternate unidirectional path, a protected path in the open-ended circuit such that the primary source and the secondary source replace the source network element when the source network element is associated with a different vendor or service provider than the first, second, and third network elements.

14. The method of claim 12, wherein receiving comprises determining when the request specifies a route for the open-ended circuit comprising a primary source, a secondary source and a destination among the first, second and third network elements, and wherein computing comprises determining a protected path from the primary source to the destination comprising:
- determining an unprotected first segment from the primary source to an intermediate node if an unprotected first segment exists;
- determining an unprotected path from the secondary source to an end of the unprotected first segment;
- determining additional segments from the end of the unprotected first segment to complete a circuit path between the primary source and the destination; and
- determining an alternate path for each unprotected segment such that an overall circuit path between the primary source and destination is protected.

15. The method of claim 12, further comprising creating a bidirectional link between the second network element and the third network to replace the representation of the link and that is configured to provide a path from the second network element to the first network element via the third network element and a path from the third network element to the first network element via the second network element such that the primary unidirectional path and alternate unidirectional path may be automatically provisioned without manual provisioning via the network administration user interface unit.

16. The method of claim 12, and further comprising linking the second network element and the third network element to the source network element, wherein computing comprises computing a path between the source network element and the first network element via the second network element for use as part of the primary path and computing a path between the source network element and the first network element via the third network element for use as part of the alternate path, and wherein the first, second, third, and source network elements are part of a unidirectional path protected switched ring (UPSR) or an open-ended sub-network connection protection (SNCP) circuit.

17. The method of claim 16, wherein the source network element is associated with a different vendor or service provider and the first, second, and third network elements are associated with the same vendor or service provider, and computing comprises computing a protected path on the basis that the source network element is deemed inaccessible or unavailable to path routing for the protected path and a link between two of the first, second, and third network elements is computed to serve as a replacement for the source network element within the UPSR or the SNCP circuit.

18. A system comprising:
- a network administration user interface unit configured to receive a request to route an open-ended circuit, the request specifying a first network element, a second network element, and a third network element, wherein the second network element and the third network element are configured to be linked to a source network element; and
- a network element configured to be coupled to the network administration user interface unit, wherein the network element comprises a computing device configured to:
  - compute for the open-ended circuit a primary path from the second network element to the first network element;
  - create a representation of a link between the second network element and the third network element that is configured to allow an alternate unidirectional path from the third network element to the first network element to be identified such that the source network element is removed and not considered as part of the alternate unidirectional path when the source network element is of a different type than the first, second and third network elements; and
  - compute for the open-ended circuit a portion of the alternate unidirectional path from the third network element to the first network element based on the identified path.

19. The system of claim 18, wherein the network administration user interface is configured to receive the request that specifies that the first network element is a destination, the second network element is a primary source, and the third network element is a secondary source and wherein the computing device is configured to compute, on the basis of the primary path and the alternate path, a protected path in the open-ended circuit such that the primary source and the secondary source replace the source network element when the source network element is associated with a different vendor or service provider than the first, second, and third network elements.

20. The system of claim 18, wherein the network administration user interface unit is configured to receive the request which specifies the open-ended circuit comprising a primary source, a secondary source and a destination among the first, second and third network elements, and wherein the computing device is configured to determine a protected path from the primary source to the destination by being configured to:
- determine an unprotected first segment from the primary source to an intermediate node if an unprotected first segment exists;
- determine an unprotected path from the secondary source to an end of the unprotected first segment;
- determine additional segments from the end of the unprotected first segment to complete a circuit path between the primary source and the destination; and
- determine an alternate path for each unprotected segment such that an overall circuit path between the primary source and destination is protected.

21. The system of claim 18, wherein the network administration user interface unit is configured to receive the request that specifies that the first network element is a destination, the second network element is a primary source and the third network element is a secondary source, and wherein the computing device is configured to compute, on the basis of the primary path and the alternate path, a protected path in the open-ended circuit such that the primary source and the secondary source replace the source network element when the source network element is associated with a different vendor or service provider than the first, second, and third network elements.

22. The system of claim 18, wherein the computing device is further configured to:
- link the second network element and the third network element to the source network element;
- compute a path between the first network element and the source network element via the second network element for use as part of the primary path; and
- compute a path between the source network element and the first network element via the third network element for use as part of the alternate path, and wherein the first, second, third and source network elements are part of a unidirectional path protected switched ring (UPSR) or an open-ended sub-network connection protection (SNCP) circuit.

23. The system of claim 22, wherein the computing device is configured to compute the primary and alternate paths on the basis that the source network element is associated with a different vendor or service provider and the first, second, and third network elements are associated with the same vendor or service provider, and the computing device is configured to compute a protected path on the basis that the source network element is deemed inaccessible or unavailable to path routing for the protected path and a link between two of the first, second, and third network elements is computed to serve as a replacement for the source network element within the UPSR or the SNCP circuit.

* * * * *